US009316404B2

(12) United States Patent
Gurin

(10) Patent No.: US 9,316,404 B2
(45) Date of Patent: Apr. 19, 2016

(54) HEAT PUMP WITH INTEGRAL SOLAR COLLECTOR

(75) Inventor: Michael H. Gurin, Glenview, IL (US)

(73) Assignee: ECHOGEN POWER SYSTEMS, LLC, Akron, OH (US)

(*) Notice: Subject to any disclaimer, the term of this patent is extended or adjusted under 35 U.S.C. 154(b) by 973 days.

(21) Appl. No.: 13/389,207

(22) PCT Filed: Aug. 4, 2010

(86) PCT No.: PCT/US2010/044476
§ 371 (c)(1),
(2), (4) Date: Jun. 18, 2012

(87) PCT Pub. No.: WO2011/017476
PCT Pub. Date: Feb. 10, 2011

(65) Prior Publication Data
US 2012/0247134 A1 Oct. 4, 2012

Related U.S. Application Data

(60) Provisional application No. 61/231,238, filed on Aug. 4, 2009.

(51) Int. Cl.
F25B 13/00 (2006.01)
F25B 27/00 (2006.01)
F24D 11/02 (2006.01)

(52) U.S. Cl.
CPC ............... *F24D 11/02* (2013.01); *F25B 27/002* (2013.01); *F24D 2200/14* (2013.01); *Y02B 10/20* (2013.01); *Y02B 10/70* (2013.01); *Y02B 30/126* (2013.01)

(58) Field of Classification Search
CPC ..... F24D 11/02; F24D 2200/14; F25B 27/002; Y02B 10/20
USPC ................................................. 62/160, 235.1
See application file for complete search history.

(56) References Cited

U.S. PATENT DOCUMENTS

| 2,575,478 A | 11/1951 | Wilson |
| 2,634,375 A | 4/1953 | Guimbal |
| 2,691,280 A | 10/1954 | Albert |
| 3,095,274 A | 6/1963 | Crawford |

(Continued)

FOREIGN PATENT DOCUMENTS

| CA | 2794150 A1 | 11/2011 |
| CN | 1165238 A | 11/1997 |

(Continued)

OTHER PUBLICATIONS

CN Search Report for Application No. 201080035382.1, 2 pages.

(Continued)

*Primary Examiner* — M. Alexandra Elve
*Assistant Examiner* — Henry Crenshaw
(74) *Attorney, Agent, or Firm* — Edmonds & Nolte, PC

(57) ABSTRACT

The present invention generally relates to heat pumps that utilize at least one solar receiver operating with the same working fluids. In one embodiment, the present invention relates to a hybrid solar heat pump comprised of at least one microchannel heat exchanger with integral solar absorber, at least one compression device as the heat pump for concurrent compression to a higher pressure and mass flow regulator of the working fluid, and at least one working fluid accumulator with the entire system operating with the same working fluid.

6 Claims, 12 Drawing Sheets

(56) References Cited

U.S. PATENT DOCUMENTS

| | | | |
|---|---|---|---|
| 3,105,748 A | 10/1963 | Stahl | |
| 3,237,403 A | 3/1966 | Feher | |
| 3,277,955 A | 10/1966 | Heller | |
| 3,401,277 A | 9/1968 | Larson | |
| 3,622,767 A | 11/1971 | Koepcke | |
| 3,630,022 A | 12/1971 | Jubb | |
| 3,736,745 A | 6/1973 | Karig | |
| 3,772,879 A | 11/1973 | Engdahl | |
| 3,791,137 A | 2/1974 | Jubb | |
| 3,830,062 A | 8/1974 | Morgan et al. | |
| 3,939,328 A | 2/1976 | Davis | |
| 3,971,211 A | 7/1976 | Wethe | |
| 3,982,379 A | 9/1976 | Gilli | |
| 3,998,058 A | 12/1976 | Park | |
| 4,009,575 A | 3/1977 | Hartman, Jr. | |
| 4,015,962 A * | 4/1977 | Tompkins | 62/175 |
| 4,029,255 A | 6/1977 | Heiser | |
| 4,030,312 A | 6/1977 | Wallin | |
| 4,049,407 A | 9/1977 | Bottum | |
| 4,070,870 A * | 1/1978 | Bahel et al. | 62/235.1 |
| 4,099,381 A | 7/1978 | Rappoport | |
| 4,119,140 A | 10/1978 | Cates | |
| 4,150,547 A | 4/1979 | Hobson | |
| 4,152,901 A | 5/1979 | Munters | |
| 4,164,848 A | 8/1979 | Gilli | |
| 4,164,849 A | 8/1979 | Mangus | |
| 4,170,435 A | 10/1979 | Swearingen | |
| 4,182,960 A | 1/1980 | Reuyl | |
| 4,183,220 A | 1/1980 | Shaw | |
| 4,198,827 A | 4/1980 | Terry et al. | |
| 4,208,882 A | 6/1980 | Lopes | |
| 4,221,185 A | 9/1980 | Scholes | |
| 4,233,085 A | 11/1980 | Roderick | |
| 4,236,869 A | 12/1980 | Laurello | |
| 4,245,476 A * | 1/1981 | Shaw | 62/235.1 |
| 4,248,049 A * | 2/1981 | Briley | 62/235.1 |
| 4,257,232 A | 3/1981 | Bell | |
| 4,287,430 A | 9/1981 | Guido | |
| 4,336,692 A | 6/1982 | Ecker | |
| 4,347,711 A | 9/1982 | Noe | |
| 4,347,714 A | 9/1982 | Kinsell | |
| 4,372,125 A | 2/1983 | Dickenson | |
| 4,384,568 A | 5/1983 | Palmatier | |
| 4,391,101 A | 7/1983 | Labbe | |
| 4,420,947 A | 12/1983 | Yoshino | |
| 4,428,190 A | 1/1984 | Bronicki | |
| 4,433,554 A | 2/1984 | Rojey | |
| 4,439,687 A | 3/1984 | Wood | |
| 4,439,994 A | 4/1984 | Briley | |
| 4,448,033 A | 5/1984 | Briccetti | |
| 4,450,363 A | 5/1984 | Russell | |
| 4,455,836 A | 6/1984 | Binstock | |
| 4,467,609 A | 8/1984 | Loomis | |
| 4,467,621 A | 8/1984 | O'Brien | |
| 4,471,622 A * | 9/1984 | Kuwahara | 60/667 |
| 4,475,353 A | 10/1984 | Lazare | |
| 4,489,562 A | 12/1984 | Snyder | |
| 4,489,563 A | 12/1984 | Kalina | |
| 4,498,289 A | 2/1985 | Osgerby | |
| 4,516,403 A | 5/1985 | Tanaka | |
| 4,538,960 A | 9/1985 | Iino et al. | |
| 4,549,401 A | 10/1985 | Spliethoff | |
| 4,555,905 A | 12/1985 | Endou | |
| 4,558,228 A | 12/1985 | Larjola | |
| 4,573,321 A | 3/1986 | Knaebel | |
| 4,578,953 A | 4/1986 | Krieger | |
| 4,589,255 A | 5/1986 | Martens | |
| 4,636,578 A | 1/1987 | Feinberg | |
| 4,674,297 A | 6/1987 | Vobach | |
| 4,694,189 A | 9/1987 | Haraguchi | |
| 4,697,981 A | 10/1987 | Brown et al. | |
| 4,700,543 A | 10/1987 | Krieger | |
| 4,730,977 A | 3/1988 | Haaser | |
| 4,756,162 A | 7/1988 | Dayan | |
| 4,765,143 A | 8/1988 | Crawford | |
| 4,773,212 A | 9/1988 | Griffin | |
| 4,798,056 A | 1/1989 | Franklin | |
| 4,813,242 A | 3/1989 | Wicks | |
| 4,821,514 A | 4/1989 | Schmidt | |
| 4,867,633 A | 9/1989 | Gravelle | |
| 4,892,459 A | 1/1990 | Guelich | |
| 4,986,071 A | 1/1991 | Voss | |
| 4,993,483 A | 2/1991 | Harris | |
| 5,000,003 A | 3/1991 | Wicks | |
| 5,050,375 A | 9/1991 | Dickinson | |
| 5,080,047 A * | 1/1992 | Williams et al. | 122/35 |
| 5,083,425 A | 1/1992 | Hendriks et al. | |
| 5,098,194 A | 3/1992 | Kuo | |
| 5,102,295 A | 4/1992 | Pope | |
| 5,104,284 A | 4/1992 | Hustak, Jr. | |
| 5,164,020 A | 11/1992 | Wagner | |
| 5,176,321 A | 1/1993 | Doherty | |
| 5,203,159 A | 4/1993 | Koizumi | |
| 5,228,310 A | 7/1993 | Vandenberg | |
| 5,291,960 A | 3/1994 | Brandenburg | |
| 5,320,482 A | 6/1994 | Palmer et al. | |
| 5,335,510 A | 8/1994 | Rockenfeller | |
| 5,358,378 A | 10/1994 | Holscher | |
| 5,360,057 A | 11/1994 | Rockenfeller | |
| 5,392,606 A | 2/1995 | Labinov | |
| 5,440,882 A | 8/1995 | Kalina | |
| 5,444,972 A | 8/1995 | Moore | |
| 5,488,828 A | 2/1996 | Brossard | |
| 5,490,386 A | 2/1996 | Keller | |
| 5,503,222 A | 4/1996 | Dunne | |
| 5,531,073 A | 7/1996 | Bronicki | |
| 5,538,564 A | 7/1996 | Kaschmitter | |
| 5,542,203 A | 8/1996 | Luoma | |
| 5,570,578 A | 11/1996 | Saujet | |
| 5,588,298 A | 12/1996 | Kalina | |
| 5,600,967 A | 2/1997 | Meckler | |
| 5,634,340 A | 6/1997 | Grennan | |
| 5,647,221 A | 7/1997 | Garris, Jr. | |
| 5,649,426 A | 7/1997 | Kalina | |
| 5,676,382 A | 10/1997 | Dahlheimer | |
| 5,680,753 A | 10/1997 | Hollinger | |
| 5,738,164 A | 4/1998 | Hildebrand | |
| 5,754,613 A | 5/1998 | Hashiguchi | |
| 5,771,700 A | 6/1998 | Cochran | |
| 5,789,822 A | 8/1998 | Calistrat | |
| 5,813,215 A | 9/1998 | Weisser | |
| 5,833,876 A | 11/1998 | Schnur | |
| 5,862,666 A | 1/1999 | Liu | |
| 5,873,260 A | 2/1999 | Linhardt | |
| 5,874,039 A | 2/1999 | Edelson | |
| 5,894,836 A | 4/1999 | Wu | |
| 5,899,067 A | 5/1999 | Hageman | |
| 5,903,060 A | 5/1999 | Norton | |
| 5,918,460 A | 7/1999 | Connell | |
| 5,941,238 A | 8/1999 | Tracy | |
| 5,943,869 A | 8/1999 | Cheng | |
| 5,946,931 A | 9/1999 | Lomax | |
| 5,973,050 A | 10/1999 | Johnson | |
| 6,037,683 A | 3/2000 | Lulay | |
| 6,041,604 A | 3/2000 | Nicodemus | |
| 6,058,930 A | 5/2000 | Shingleton | |
| 6,062,815 A | 5/2000 | Holt | |
| 6,065,280 A | 5/2000 | Ranasinghe | |
| 6,066,797 A | 5/2000 | Toyomura | |
| 6,070,405 A | 6/2000 | Jerye | |
| 6,082,110 A | 7/2000 | Rosenblatt | |
| 6,105,368 A | 8/2000 | Hansen | |
| 6,112,547 A | 9/2000 | Spauschus | |
| 6,129,507 A | 10/2000 | Ganelin | |
| 6,158,237 A | 12/2000 | Riffat | |
| 6,164,655 A | 12/2000 | Bothien | |
| 6,202,782 B1 | 3/2001 | Hatanaka | |
| 6,223,846 B1 | 5/2001 | Schechter | |
| 6,233,938 B1 | 5/2001 | Nicodemus | |
| 6,233,955 B1 * | 5/2001 | Egara | 62/196.4 |
| 6,282,900 B1 | 9/2001 | Bell | |
| 6,282,917 B1 | 9/2001 | Mongan | |
| 6,295,818 B1 | 10/2001 | Ansley | |
| 6,299,690 B1 | 10/2001 | Mongeon | |

(56) References Cited

U.S. PATENT DOCUMENTS

| | | |
|---|---|---|
| 6,341,781 B1 | 1/2002 | Matz |
| 6,374,630 B1 | 4/2002 | Jones |
| 6,393,851 B1 | 5/2002 | Wightman |
| 6,432,320 B1 | 8/2002 | Bonsignore |
| 6,434,955 B1 | 8/2002 | Ng |
| 6,442,951 B1 | 9/2002 | Maeda |
| 6,446,425 B1 | 9/2002 | Lawlor |
| 6,446,465 B1 | 9/2002 | Dubar |
| 6,463,730 B1 | 10/2002 | Keller |
| 6,484,490 B1 | 11/2002 | Olsen |
| 6,539,720 B2 | 4/2003 | Rouse et al. |
| 6,539,728 B2 | 4/2003 | Korin |
| 6,571,548 B1 | 6/2003 | Bronicki |
| 6,581,384 B1 | 6/2003 | Benson |
| 6,598,397 B2 | 7/2003 | Hanna |
| 6,644,062 B1 | 11/2003 | Hays |
| 6,657,849 B1 | 12/2003 | Andresakis |
| 6,668,554 B1 | 12/2003 | Brown |
| 6,684,625 B2 | 2/2004 | Kline |
| 6,695,974 B2 | 2/2004 | Withers |
| 6,715,294 B2 | 4/2004 | Anderson |
| 6,734,585 B2 | 5/2004 | Tornquist |
| 6,735,948 B1 | 5/2004 | Kalina |
| 6,739,142 B2 | 5/2004 | Korin |
| 6,751,959 B1 | 6/2004 | McClanahan |
| 6,769,256 B1 | 8/2004 | Kalina |
| 6,799,892 B2 | 10/2004 | Leuthold |
| 6,808,179 B1 | 10/2004 | Bhattacharyya |
| 6,810,335 B2 | 10/2004 | Lysaght |
| 6,817,185 B2 | 11/2004 | Coney |
| 6,857,268 B2 | 2/2005 | Stinger |
| 6,910,334 B2 | 6/2005 | Kalina |
| 6,918,254 B2 | 7/2005 | Baker |
| 6,921,518 B2 | 7/2005 | Johnston |
| 6,941,757 B2 | 9/2005 | Kalina |
| 6,960,839 B2 | 11/2005 | Zimron |
| 6,960,840 B2 | 11/2005 | Willis |
| 6,962,054 B1 | 11/2005 | Linney |
| 6,964,168 B1 | 11/2005 | Pierson |
| 6,968,690 B2 | 11/2005 | Kalina |
| 6,986,251 B2 | 1/2006 | Radcliff |
| 7,013,205 B1 | 3/2006 | Hafner |
| 7,021,060 B1 | 4/2006 | Kalina |
| 7,022,294 B2 | 4/2006 | Johnston |
| 7,033,533 B2 | 4/2006 | Lewis-Aburn |
| 7,033,553 B2 | 4/2006 | Johnston et al. |
| 7,036,315 B2 | 5/2006 | Kang |
| 7,041,272 B2 | 5/2006 | Keefer |
| 7,047,744 B1 | 5/2006 | Robertson |
| 7,048,782 B1 | 5/2006 | Couch |
| 7,062,913 B2 | 6/2006 | Christensen |
| 7,096,665 B2 | 8/2006 | Stinger |
| 7,096,679 B2 | 8/2006 | Manole |
| 7,124,587 B1 | 10/2006 | Linney |
| 7,174,715 B2 | 2/2007 | Armitage |
| 7,194,863 B2 | 3/2007 | Ganev |
| 7,197,876 B1 | 4/2007 | Kalina |
| 7,200,996 B2 | 4/2007 | Cogswell |
| 7,234,314 B1 | 6/2007 | Wiggs |
| 7,249,588 B2 | 7/2007 | Russell |
| 7,278,267 B2 | 10/2007 | Yamada |
| 7,279,800 B2 | 10/2007 | Bassett |
| 7,287,381 B1 | 10/2007 | Pierson |
| 7,305,829 B2 | 12/2007 | Mirolli |
| 7,313,926 B2 | 1/2008 | Gurin |
| 7,340,894 B2 | 3/2008 | Miyahara et al. |
| 7,340,897 B2 | 3/2008 | Zimron |
| 7,406,830 B2 | 8/2008 | Valentian |
| 7,416,137 B2 | 8/2008 | Hagen et al. |
| 7,453,242 B2 | 11/2008 | Ichinose |
| 7,458,217 B2 | 12/2008 | Kalina |
| 7,458,218 B2 | 12/2008 | Kalina |
| 7,464,551 B2 | 12/2008 | Althaus et al. |
| 7,469,542 B2 | 12/2008 | Kalina |
| 7,516,619 B2 | 4/2009 | Pelletier |
| 7,600,394 B2 | 10/2009 | Kalina |
| 7,621,133 B2 | 11/2009 | Tomlinson |
| 7,654,354 B1 | 2/2010 | Otterstrom |
| 7,665,291 B2 | 2/2010 | Anand |
| 7,665,304 B2 | 2/2010 | Sundel |
| 7,685,821 B2 | 3/2010 | Kalina |
| 7,730,713 B2 | 6/2010 | Nakano |
| 7,735,335 B2 | 6/2010 | Uno |
| 7,770,376 B1 | 8/2010 | Brostmeyer |
| 7,775,758 B2 | 8/2010 | Legare |
| 7,827,791 B2 | 11/2010 | Pierson |
| 7,838,470 B2 | 11/2010 | Shaw |
| 7,841,179 B2 | 11/2010 | Kalina |
| 7,841,306 B2 | 11/2010 | Myers |
| 7,854,587 B2 | 12/2010 | Ito |
| 7,866,157 B2 | 1/2011 | Ernst |
| 7,900,450 B2 | 3/2011 | Gurin |
| 7,950,230 B2 | 5/2011 | Nishikawa |
| 7,950,243 B2 | 5/2011 | Gurin |
| 7,972,529 B2 | 7/2011 | Machado |
| 7,997,076 B2 | 8/2011 | Ernst |
| 8,096,128 B2 | 1/2012 | Held et al. |
| 8,099,198 B2 | 1/2012 | Gurin |
| 8,146,360 B2 | 4/2012 | Myers |
| 8,281,593 B2 | 10/2012 | Held |
| 8,419,936 B2 | 4/2013 | Berger et al. |
| 2001/0015061 A1 | 8/2001 | Viteri et al. |
| 2001/0020444 A1 | 9/2001 | Johnston |
| 2001/0030404 A1 | 10/2001 | Liu |
| 2001/0030952 A1 | 10/2001 | Roy |
| 2002/0029558 A1 | 3/2002 | Tamaro |
| 2002/0066270 A1 | 6/2002 | Rouse et al. |
| 2002/0078696 A1 | 6/2002 | Korin |
| 2002/0078697 A1 | 6/2002 | Lifson |
| 2002/0082747 A1 | 6/2002 | Kramer |
| 2003/0000213 A1 | 1/2003 | Christensen |
| 2003/0061823 A1 | 4/2003 | Alden |
| 2003/0154718 A1 | 8/2003 | Nayar |
| 2003/0182946 A1 | 10/2003 | Sami |
| 2003/0213246 A1 | 11/2003 | Coll et al. |
| 2003/0221438 A1 | 12/2003 | Rane et al. |
| 2004/0011038 A1 | 1/2004 | Stinger |
| 2004/0011039 A1 | 1/2004 | Stinger et al. |
| 2004/0020185 A1 | 2/2004 | Brouillette et al. |
| 2004/0020206 A1 | 2/2004 | Sullivan et al. |
| 2004/0021182 A1 | 2/2004 | Green et al. |
| 2004/0035117 A1 | 2/2004 | Rosen |
| 2004/0083731 A1 | 5/2004 | Lasker |
| 2004/0083732 A1 | 5/2004 | Hanna et al. |
| 2004/0088992 A1 | 5/2004 | Brasz et al. |
| 2004/0097388 A1 | 5/2004 | Brask et al. |
| 2004/0105980 A1 | 6/2004 | Sudarshan et al. |
| 2004/0107700 A1 | 6/2004 | McClanahan et al. |
| 2004/0159110 A1* | 8/2004 | Janssen .................... 62/77 |
| 2004/0211182 A1 | 10/2004 | Gould |
| 2005/0022963 A1 | 2/2005 | Garrabrant et al. |
| 2005/0056001 A1 | 3/2005 | Frutschi |
| 2005/0096676 A1 | 5/2005 | Gifford, III et al. |
| 2005/0109387 A1 | 5/2005 | Marshall |
| 2005/0137777 A1 | 6/2005 | Kolavennu et al. |
| 2005/0162018 A1 | 7/2005 | Realmuto et al. |
| 2005/0167169 A1 | 8/2005 | Gering et al. |
| 2005/0183421 A1 | 8/2005 | Vaynberg et al. |
| 2005/0196676 A1 | 9/2005 | Singh et al. |
| 2005/0198959 A1 | 9/2005 | Schubert |
| 2005/0227187 A1 | 10/2005 | Schilling |
| 2005/0252235 A1 | 11/2005 | Critoph et al. |
| 2005/0257812 A1 | 11/2005 | Wright et al. |
| 2006/0010868 A1 | 1/2006 | Smith |
| 2006/0060333 A1 | 3/2006 | Chordia et al. |
| 2006/0066113 A1 | 3/2006 | Ebrahim et al. |
| 2006/0080960 A1 | 4/2006 | Rajendran et al. |
| 2006/0112693 A1 | 6/2006 | Sundel |
| 2006/0112702 A1* | 6/2006 | Martin et al. .................... 62/180 |
| 2006/0182680 A1 | 8/2006 | Keefer et al. |
| 2006/0211871 A1 | 9/2006 | Dai et al. |
| 2006/0213218 A1 | 9/2006 | Uno et al. |
| 2006/0225421 A1 | 10/2006 | Yamanaka et al. |
| 2006/0225459 A1 | 10/2006 | Meyer |

(56) References Cited

U.S. PATENT DOCUMENTS

| | | |
|---|---|---|
| 2006/0249020 A1 | 11/2006 | Tonkovich et al. |
| 2006/0254281 A1 | 11/2006 | Badeer et al. |
| 2007/0001766 A1 | 1/2007 | Ripley et al. |
| 2007/0017192 A1 | 1/2007 | Bednarek et al. |
| 2007/0019708 A1 | 1/2007 | Shiflett et al. |
| 2007/0027038 A1 | 2/2007 | Kamimura et al. |
| 2007/0056290 A1 | 3/2007 | Dahm |
| 2007/0089449 A1* | 4/2007 | Gurin ........................... 62/324.2 |
| 2007/0108200 A1 | 5/2007 | McKinzie, II |
| 2007/0119175 A1 | 5/2007 | Ruggieri et al. |
| 2007/0130952 A1 | 6/2007 | Copen |
| 2007/0151244 A1 | 7/2007 | Gurin |
| 2007/0161095 A1 | 7/2007 | Gurin |
| 2007/0163261 A1 | 7/2007 | Strathman |
| 2007/0195152 A1 | 8/2007 | Kawai et al. |
| 2007/0204620 A1 | 9/2007 | Pronske et al. |
| 2007/0227472 A1 | 10/2007 | Takeuchi et al. |
| 2007/0234722 A1 | 10/2007 | Kalina |
| 2007/0245733 A1 | 10/2007 | Pierson et al. |
| 2007/0246206 A1 | 10/2007 | Gong et al. |
| 2008/0000225 A1 | 1/2008 | Kalina |
| 2008/0006040 A1 | 1/2008 | Peterson et al. |
| 2008/0010967 A1 | 1/2008 | Griffin et al. |
| 2008/0023666 A1 | 1/2008 | Gurin |
| 2008/0053095 A1 | 3/2008 | Kalina |
| 2008/0066470 A1 | 3/2008 | MacKnight |
| 2008/0135253 A1 | 6/2008 | Vinegar et al. |
| 2008/0163625 A1 | 7/2008 | O'Brien |
| 2008/0173450 A1 | 7/2008 | Goldberg et al. |
| 2008/0211230 A1 | 9/2008 | Gurin |
| 2008/0250789 A1 | 10/2008 | Myers et al. |
| 2008/0252078 A1 | 10/2008 | Myers |
| 2008/0282715 A1* | 11/2008 | Aue et al. .......................... 62/159 |
| 2009/0021251 A1 | 1/2009 | Simon |
| 2009/0085709 A1 | 4/2009 | Meinke |
| 2009/0107144 A1 | 4/2009 | Moghtaderi et al. |
| 2009/0139234 A1 | 6/2009 | Gurin |
| 2009/0139781 A1 | 6/2009 | Straubel |
| 2009/0173337 A1 | 7/2009 | Tamaura et al. |
| 2009/0173486 A1 | 7/2009 | Copeland |
| 2009/0180903 A1 | 7/2009 | Martin et al. |
| 2009/0205892 A1 | 8/2009 | Jensen et al. |
| 2009/0211251 A1 | 8/2009 | Petersen et al. |
| 2009/0211253 A1 | 8/2009 | Radcliff et al. |
| 2009/0266075 A1 | 10/2009 | Westmeier et al. |
| 2009/0293503 A1 | 12/2009 | Vandor |
| 2010/0024421 A1 | 2/2010 | Litwin |
| 2010/0077792 A1 | 4/2010 | Gurin |
| 2010/0083662 A1 | 4/2010 | Kalina |
| 2010/0102008 A1 | 4/2010 | Hedberg |
| 2010/0122533 A1 | 5/2010 | Kalina |
| 2010/0146949 A1 | 6/2010 | Stobart et al. |
| 2010/0146973 A1 | 6/2010 | Kalina |
| 2010/0156112 A1 | 6/2010 | Held et al. |
| 2010/0162721 A1 | 7/2010 | Welch et al. |
| 2010/0205962 A1 | 8/2010 | Kalina |
| 2010/0218513 A1 | 9/2010 | Vaisman et al. |
| 2010/0218930 A1 | 9/2010 | Proeschel |
| 2010/0263380 A1 | 10/2010 | Biederman et al. |
| 2010/0287934 A1 | 11/2010 | Glynn et al. |
| 2010/0300093 A1 | 12/2010 | Doty |
| 2010/0326076 A1 | 12/2010 | Ast et al. |
| 2011/0027064 A1 | 2/2011 | Pal et al. |
| 2011/0030404 A1 | 2/2011 | Gurin |
| 2011/0048012 A1 | 3/2011 | Ernst et al. |
| 2011/0061384 A1 | 3/2011 | Held et al. |
| 2011/0061387 A1 | 3/2011 | Held et al. |
| 2011/0088399 A1 | 4/2011 | Briesch et al. |
| 2011/0179799 A1 | 7/2011 | Allam et al. |
| 2011/0185729 A1 | 8/2011 | Held |
| 2011/0192163 A1 | 8/2011 | Kasuya |
| 2011/0203278 A1 | 8/2011 | Kopecek et al. |
| 2011/0259010 A1 | 10/2011 | Bronicki et al. |
| 2011/0299972 A1 | 12/2011 | Morris et al. |
| 2011/0308253 A1 | 12/2011 | Ritter |
| 2012/0047892 A1 | 3/2012 | Held et al. |
| 2012/0067055 A1 | 3/2012 | Held |
| 2012/0128463 A1 | 5/2012 | Held |
| 2012/0131918 A1 | 5/2012 | Held |
| 2012/0131919 A1 | 5/2012 | Held |
| 2012/0131920 A1 | 5/2012 | Held |
| 2012/0131921 A1 | 5/2012 | Held |
| 2012/0159922 A1 | 6/2012 | Gurin |
| 2012/0159956 A1 | 6/2012 | Gurin |
| 2012/0174558 A1 | 7/2012 | Gurin |
| 2012/0186219 A1 | 7/2012 | Gurin |
| 2012/0247134 A1* | 10/2012 | Gurin .............................. 62/129 |
| 2012/0247455 A1 | 10/2012 | Gurin et al. |
| 2012/0261090 A1 | 10/2012 | Durmaz et al. |
| 2013/0019597 A1 | 1/2013 | Kalina |
| 2013/0033037 A1 | 2/2013 | Held et al. |
| 2013/0036736 A1 | 2/2013 | Hart et al. |
| 2013/0113221 A1 | 5/2013 | Held |

FOREIGN PATENT DOCUMENTS

| | | |
|---|---|---|
| CN | 1432102 A | 7/2003 |
| CN | 101614139 A | 12/2009 |
| CN | 202055876 U | 11/2011 |
| CN | 202544943 U | 11/2012 |
| CN | 202718721 U | 2/2013 |
| DE | 2632777 A1 | 2/1977 |
| DE | 199906087 | 8/2000 |
| DE | 10052993 A1 | 5/2002 |
| EP | 1977174 A2 | 10/2008 |
| EP | 1998013 A2 | 12/2008 |
| EP | 2419621 A1 | 2/2012 |
| EP | 2446122 A1 | 5/2012 |
| EP | 2478201 A1 | 7/2012 |
| EP | 2500530 A1 | 9/2012 |
| EP | 2550436 | 1/2013 |
| GB | 856985 A | 12/1960 |
| GB | 2010974 A | 7/1979 |
| GB | 2075608 | 11/1981 |
| JP | 58193051 | 11/1983 |
| JP | 60040707 A | 3/1985 |
| JP | 61-152914 A | 7/1986 |
| JP | 01-240705 A | 9/1989 |
| JP | 05-321612 A | 12/1993 |
| JP | 06-331225 A | 11/1994 |
| JP | 08028805 A | 2/1996 |
| JP | 09-100702 A | 4/1997 |
| JP | 2641581 B2 | 5/1997 |
| JP | 09-209716 A | 8/1997 |
| JP | 2858750 B2 | 12/1998 |
| JP | H11270352 | 5/1999 |
| JP | 2000257407 A | 9/2000 |
| JP | 2001-193419 A | 7/2001 |
| JP | 2002-097965 A | 4/2002 |
| JP | 2003529715 A | 10/2003 |
| JP | 2004-239250 A | 8/2004 |
| JP | 2004-332626 A | 11/2004 |
| JP | 2005030727 A | 2/2005 |
| JP | 2005-533972 A1 | 11/2005 |
| JP | 2006037760 A | 2/2006 |
| JP | 2006177266 A | 7/2006 |
| JP | 2007-198200 A | 9/2007 |
| JP | 4343738 B2 | 10/2009 |
| JP | 2011-017268 A | 1/2011 |
| KR | 100191080 | 6/1999 |
| KR | 10-2007-0086244 A | 8/2007 |
| KR | 10-0766101 B1 | 10/2007 |
| KR | 10-0844634 A | 7/2008 |
| KR | 10-20100067927 A | 6/2010 |
| KR | 1020110018769 A | 2/2011 |
| KR | 1069914 B1 | 9/2011 |
| KR | 1103549 B1 | 1/2012 |
| KR | 10-2012-0058582 A | 6/2012 |
| KR | 2012-0068670 A | 6/2012 |
| KR | 2012-0128753 A | 6/2012 |
| KR | 2012-0128753 A | 11/2012 |
| KR | 2012-0128755 A | 11/2012 |
| WO | WO 91/05145 A1 | 4/1991 |
| WO | 9609500 | 3/1996 |

(56) References Cited

FOREIGN PATENT DOCUMENTS

| WO | 0071944 A1 | 11/2000 |
|---|---|---|
| WO | WO 01/44658 A1 | 6/2001 |
| WO | WO 2006/060253 | 6/2006 |
| WO | WO 2006/137957 A1 | 12/2006 |
| WO | WO 2007/056241 A2 | 5/2007 |
| WO | 2007082103 | 7/2007 |
| WO | WO 2007/079245 A2 | 7/2007 |
| WO | WO 2007082103 A2 * | 7/2007 |
| WO | WO 2007/112090 A2 | 10/2007 |
| WO | WO 2008/039725 A2 | 4/2008 |
| WO | 2008101711 A2 | 8/2008 |
| WO | wo 2009/045196 A1 | 4/2009 |
| WO | WO 2009/058992 A2 | 5/2009 |
| WO | 2010083198 A1 | 7/2010 |
| WO | WO 2010/074173 A1 | 7/2010 |
| WO | WO 2010/121255 A1 | 10/2010 |
| WO | WO 2010/126980 A2 | 11/2010 |
| WO | WO 2010/151560 A1 | 12/2010 |
| WO | 2011017450 | 2/2011 |
| WO | 2011017599 | 2/2011 |
| WO | WO 2011/017476 A1 | 2/2011 |
| WO | WO 2011/034984 A1 | 3/2011 |
| WO | WO 2011/094294 A2 | 8/2011 |
| WO | WO 2011/119650 A2 | 9/2011 |
| WO | WO 2012/074905 A2 | 6/2012 |
| WO | WO 2012/074907 A2 | 6/2012 |
| WO | WO 2012/074911 A2 | 6/2012 |
| WO | WO 2012/074940 A2 | 6/2012 |
| WO | WO 2013/055391 A1 | 4/2013 |
| WO | WO 2013/059687 A1 | 4/2013 |
| WO | WO 2013/059695 A1 | 4/2013 |
| WO | WO 2013/070249 A1 | 5/2013 |
| WO | WO 2013/074907 A1 | 5/2013 |

OTHER PUBLICATIONS

CN Search Report for Application No. 201080050795.7, 2 pages.
PCT/US2011/062198—Extended European Search Report dated May 6, 2014, 9 pages.
PCT/US2011/062201—Extended European Search Report dated May 28, 2014, 8 pages.
PCT/US2013/055547—Notification of Transmittal of the International Search Report and the Written Opinion of the International Searching Authority, or the Declaration dated Jan. 24, 2014, 11 pages.
PCT/US2013/064470—Notification of Transmittal of the International Search Report and the Written Opinion of the International Searching Authority, or the Declaration dated Jan. 22, 2014, 10 pages.
PCT/US2013/064471—Notification of Transmittal of the International Search Report and the Written Opinion of the International Searching Authority, or the Declaration dated Jan. 24, 2014, 10 pages.
PCT/US2014/013154—International Search Report dated May 23, 2014, 4 pages.
PCT/US2014/013170—Notification of Transmittal of the International Search Report and the Written Opinion of the International Searching Authority, or the Declaration dated May 9, 2014, 12 pages.
PCT/US2014/023026—Notification of Transmittal of the International Search Report and the Written Opinion of the International Searching Authority, or the Declaration dated Jul. 22, 2014, 11 pages.
PCT/US2014/023990—Notification of Transmittal of the International Search Report and the Written Opinion of the International Searching Authority, or the Declaration dated Jul. 17, 2014, 10 pages.
PCT/US2014/026173—Notification of Transmittal of the International Search Report and the Written Opinion of the International Searching Authority, or the Declaration dated Jul. 9, 2014, 10 pages.
Renz, Manfred, "The New Generation Kalina Cycle", Contribution to the Conference: "Electricity Generation from Enhanced Geothermal Systems", Sep. 14, 2006, Strasbourg, France, 18 pages.
Thorin, Eva, "Power Cycles with Ammonia-Water Mixtures as Working Fluid", Doctoral Thesis, Department of Chemical Engineering and Technology Energy Processes, Royal Institute of Technology, Stockholm, Sweden, 2000, 66 pages.
PCT/US2010/044476—International Search Report and Written Opinion mailed Sep. 29, 2010.
PCT/US2010/044681—International Search Report and Written Opinion mailed Oct. 7, 2010.
Alpy, N., et al., "French Atomic Energy Commission views as regards SCO2 Cycle Development priorities and related R&D approach," Presentation, Symposium on SCO2 Power Cycles, Apr. 29-30, 2009, Troy, NY, 20 pages.
Angelino, G., and Invernizzi, C.M., "Carbon Dioxide Power Cycles using Liquid Natural Gas as Heat Sink", Applied Thermal Engineering Mar. 3, 2009, 43 pages.
Bryant, John C., Saari, Henry, and Zanganeh, Kourosh, "An Analysis and Comparison of the Simple and Recompression Supercritical CO2 Cycles" Supercritical CO2 Power Cycle Symposium, May 24-25, 2011, Boulder, CO, 8 pages.
Chapman, Daniel J., Arias, Diego A., "An Assessment of the Supercritical Carbon Dioxide Cycle for Use in a Solar Parabolic Trough Power Plant", Presentation, Abengoa Solar, Apr. 29-30, 2009, Troy, NY, 20 pages.
Chapman, Daniel J., Arias, Diego A., "An Assessment of the Supercritical Carbon Dioxide Cycle for Use in a Solar Parabolic Trough Power Plant", Paper, Abengoa Solar, Apr. 29-30, 2009, Troy, NY, 5 pages.
Chen, Yang, Lundqvist, P., Johansson, A., Platell, P., "A Comparative Study of the Carbon Dioxide Transcritical Power Cycle Compared with an Organic Rankine Cycle with R123 as Working Fluid in Waste Heat Recovery", Science Direct, Applied Thermal Engineering, Jun. 12, 2006, 6 pages.
Chen, Yang, "Thermodynamic Cycles Using Carbon Dioxide as Working Fluid", Doctoral Thesis, School of Industrial Engineering and Management, Stockholm, Oct. 2011, 150 pages., (3 parts).
Chordia, Lalit, "Optimizing Equipment for Supercritical Applications", Thar Energy LLC, Supercritical CO2 Power Cycle Symposium, May 24-25, 2011, Boulder, CO, 7 pages.
Combs, Osie V., "An Investigation of the Supercritical CO2 Cycle (Feher cycle) for Shipboard Application", Massachusetts Institute of Technology, May 1977, 290 pages.
Di Bella, Francis A., "Gas Turbine Engine Exhaust Waste Heat Recovery Navy Shipboard Module Development", Supercritical CO2 Power Cycle Symposium, May 24-25, 2011, Boulder, CO, 8 pages.
Dostal, V., et al., A Supercritical Carbon Dioxide Cycle for Next Generation Nuclear Reactors, Mar. 10, 2004, 326 pages., (7 parts).
Dostal, Vaclav and Kulhanek, Martin, "Research on the Supercritical Carbon Dioxide Cycles in the Czech Republic", Czech Technical University in Prague, Symposium on SCO2 Power Cycles, Apr. 29-30, 2009, Troy, NY, 8 pages.
Dostal, Vaclav, and Dostal, Jan, "Supercritical CO2 Regeneration Bypass Cycle—Comparison to Traditional Layouts", Supercritical CO2 Power Cycle Symposium, May 24-25, 2011, Boulder, CO, 5 pages.
Eisemann, Kevin, and Fuller, Robert L., "Supercritical CO2 Brayton Cycle Design and System Start-up Options", Barber Nichols, Inc., Paper, Supercritical CO2 Power Cycle Symposium, May 24-25, 2011, Boulder, CO, 7 pages.
Eisemann, Kevin, and Fuller, Robert L., "Supercritical CO2 Brayton Cycle Design and System Start-up Options", Presentation, Supercritical CO2 Power Cycle Symposium, May 24-25, 2011, Boulder, CO, 11 pages.
Feher, E.G., et al., "Investigation of Supercritical (Feher) Cycle", Astropower Laboratory, Missile & Space Systems Division, Oct. 1968, 152 pages.
Fuller, Robert L., and Eisemann, Kevin, "Centrifugal Compressor Off-Design Performance for Super-Critical CO2", Barber Nichols, Inc. Presentation, Supercritical CO2 Power Cycle Symposium, May 24-25, 2011, Boulder, CO, 20 pages.
Fuller, Robert L., and Eisemann, Kevin, "Centrifugal Compressor Off-Design Performance for Super-Critical CO2", Paper, Supercritical CO2 Power Cycle Symposium, May 24-25, 2011, Boulder, CO, 12 pages.

(56) References Cited

OTHER PUBLICATIONS

Gokhstein, D.P. and Verkhivker, G.P. "Use of Carbon Dioxide as a Heat Carrier and Working Substance in Atomic Power Stations", Soviet Atomic Energy, Apr. 1969, vol. 26, Issue 4, pp. 430-432.

Gokhstein, D.P.; Taubman, E.I.; Konyaeva, G.P., "Thermodynamic Cycles of Carbon Dioxide Plant with an Additional Turbine After the Regenerator", Energy Citations Database, Mar. 1973, 1 Page, Abstract only.

Hejzlar, P. et al., "Assessment of Gas Cooled Gas Reactor with Indirect Supercritical CO2 Cycle" Massachusetts Institute of Technology, Jan. 2006, 10 pages.

Hoffman, John R., and Feher, E.G., "150 kwe Supercritical Closed Cycle System", Transactions of the ASME, Jan. 1971, pp. 70-80.

Jeong, Woo Seok, et al., "Performance of S-CO2 Brayton Cycle with Additive Gases for SFR Application", Korea Advanced Institute of Science and Technology, Supercritical CO2 Power Cycle Symposium, May 24-25, 2011, Boulder, CO, 5 pages.

Johnson, Gregory A., & McDowell, Michael, "Issues Associated with Coupling Supercritical CO2 Power Cycles to Nuclear, Solar and Fossil Fuel Heat Sources", Hamilton Sundstrand, Energy Space & Defense-Rocketdyne, Apr. 29-30, 2009, Troy, NY, Presentation, 18 pages.

Kawakubo, Tomoki, "Unsteady Roto-Stator Interaction of a Radial-Inflow Turbine with Variable Nozzle Vanes", ASME Turbo Expo 2010: Power for Land, Sea, and Air; vol. 7: Turbomachinery, Parts A, B, and C; Glasgow, UK, Jun. 14-18, 2010, Paper No. GT2010-23677, pp. 2075-2084, (1 page, Abstract only).

Kulhanek, Martin, "Thermodynamic Analysis and Comparison of S-CO2 Cycles", Presentation, Czech Technical University in Prague, Supercritical CO2 Power Cycle Symposium, May 24-25, 2011, Boulder, CO, 14 pages.

Kulhanek, Martin, "Thermodynamic Analysis and Comparison of S-CO2 Cycles", Paper, Czech Technical University in Prague, Supercritical CO2 Power Cycle Symposium, May 24-25, 2011, Boulder, CO, 7 pages.

Kulhanek, Martin., and Dostal, Vaclav, "Supercritical Carbon Dioxide Cycles Thermodynamic Analysis and Comparison", Abstract, Faculty Conference held in Prague, Mar. 24, 2009, 13 pages.

Ma, Zhiwen and Turchi, Craig S., "Advanced Supercritical Carbon Dioxide Power Cycle Configurations for Use in Concentrating Solar Power Systems", National Renewable Energy Laboratory, Supercritical CO2 Power Cycle Symposium, May 24-25, 2011, Boulder, CO, 4 pages.

Moisseytsev, Anton, and Sienicki, Jim, "Investigation of Alternative Layouts for the Supercritical Carbon Dioxide Brayton Cycle for a Sodium-Cooled Fast Reactor", Supercritical CO2 Power Cycle Symposium, Troy, NY, Apr. 29, 2009, 26 pages.

Munoz De Escalona, Jose M., "The Potential of the Supercritical Carbon Dioxide Cycle in High Temperature Fuel Cell Hybrid Systems", Paper, Thermal Power Group, University of Seville, Supercritical CO2 Power Cycle Symposium, May 24-25, 2011, Boulder, CO, 6 pages.

Munoz De Escalona, Jose M., et al., "The Potential of the Supercritical Carbon Dioxide Cycle in High Temperature Fuel Cell Hybrid Systems", Presentation, Thermal Power Group, University of Seville, Supercritical CO2 Power Cycle Symposium, May 24-25, 2011, Boulder, CO, 19 pages.

Muto, Y., et al., "Application of Supercritical CO2 Gas Turbine for the Fossil Fired Thermal Plant", Journal of Energy and Power Engineering, Sep. 30, 2010, vol. 4, No. 9, 9 pages.

Muto, Yasushi, and Kato, Yasuyoshi, "Optimal Cycle Scheme of Direct Cycle Supercritical CO2 Gas Turbine for Nuclear Power Generation Systems", International Conference on Power Engineering-2007, Oct. 23-27, 2007, Hangzhou, China, pp. 86-87.

Noriega, Bahamonde J.S., "Design Method for s-CO2 Gas Turbine Power Plants", Master of Science Thesis, Delft University of Technology, Oct. 2012, 122 pages., (3 parts).

Oh, Chang, et al., "Development of a Supercritical Carbon Dioxide Brayton Cycle: Improving PBR Efficiency and Testing Material Compatibility", Presentation, Nuclear Energy Research Initiative Report, Oct. 2004, 38 pages.

Oh, Chang; et al., "Development of a Supercritical Carbon Dioxide Brayton Cycle: Improving VHTR Efficiency and Testing Material Compatibility", Presentation, Nuclear Energy Research Initiative Report, Final Report, Mar. 2006, 97 pages.

Parma, Ed, et al., "Supercritical CO2 Direct Cycle Gas Fast Reactor (SC-GFR) Concept" Presentation for Supercritical CO2 Power Cycle Symposium, May 24-25, 2011, Boulder, CO, 40 pages.

Parma, Ed, et al., "Supercritical CO2 Direct Cycle Gas Fast Reactor (SC-GFR) Concept", Supercritical CO2 Power Cycle Symposium, May 24-25, 2011, Boulder, CO, 9 pages.

Parma, Edward J., et al., "Supercritical CO2 Direct Cycle Gas Fast Reactor (SC-GFR) Concept", Presentation, Sandia National Laboratories, May 2011, 55 pages.

PCT/US2006/049623 (EPS-020PCT)—Written Opinion of ISA dated Jan. 4, 2008, 4 pages.

PCT/US2007/001120 (EPS-019PCT)—International Search Report dated Apr. 25, 2008, 7 pages.

PCT/US2007/079318 (EPS-021PCT)—International Preliminary Report on Patentability dated Jul. 7, 2008, 5 pages.

PCT/US2010/031614 (EPS-014)—International Search Report dated Jul. 12, 2010, 3 pages.

PCT/US2010/031614—(EPS-14)—International Preliminary Report on Patentability dated Oct. 27, 2011, 9 pages.

PCT/US2010/039559 (EPS-015)—International Preliminary Report on Patentability dated Jan. 12, 2012, 7 pages.

PCT/US2010/039559 (EPS-015)—Notification of Transmittal of the International Search Report and Written Opinion of the International Searching Authority, or the Declaration dated Sep. 1, 2010, 6 pages.

PCT/US2010/044681(EPS-016)—International Preliminary Report on Patentability dated Feb. 16, 2012, 9 pages.

PCT/US2010/049042 (EPS-008)—International Search Report and Written Opinion dated Nov. 17, 2010, 11 pages.

PCT/US2010/049042 (EPS-008)—International Preliminary Report on Patentability dated Mar. 29, 2012, 18 pages.

PCT/US2011/029486 (EPS-002)—International Preliminary Report on Patentability dated Sep. 25, 2012, 6 pages.

PCT/US2011/029486 (EPS-002)—International Search Report and Written Opinion dated Nov. 16, 2011, 9 pages.

PCT/US2011/062266 (EPS-069)—International Search Report and Written Opinion dated Jul. 9, 2012, 12 pages.

PCT/US2011/062198 (EPS-070)—International Search Report and Written Opinion dated Jul. 2, 2012, 9 pages.

PCT/US2011/062201 (EPS-071)—International Search Report and Written Opinion dated Jun. 26, 2012, 9 pages.

PCT/US2011/062204 (EPS-072)—International Search Report dated Nov. 1, 2012, 10 pages.

PCT/US2011/62207 (EPS-073)—International Search Report and Written Opinion dated Jun. 28, 2012, 7 pages.

PCT/US2012/000470 (EPS-124)—International Search Report dated Mar. 8, 2013, 10 pages.

PCT/US2012/061151 (EPS-125)—International Search Report and Written Opinion dated Feb. 25, 2013, 9 pages.

PCT/US2012/061159 (EPS-126)—International Search Report dated Mar. 2, 2013, 10 pages.

Persichilli, Michael, et al., "Supercritical CO2 Power Cycle Developments and Commercialization: Why sCO2 can Displace Steam" Echogen Power Systems LLC, Power-Gen India & Central Asia 2012, Apr. 19-21, 2012, New Delhi, India, 15 pages.

Saari, Henry, et al., "Supercritical CO2 Advanced Brayton Cycle Design", Presentation, Carleton University, Supercritical CO2 Power Cycle Symposium, May 24-25, 2011, Boulder, CO, 21 pages.

San Andres, Luis, "Start-Up Response of Fluid Film Lubricated Cryogenic Turbopumps (Preprint)", AIAA/ASME/SAE/ASEE Joint Propulsion Conference, Cincinnati, OH, Jul. 8-11, 2007, 38 pages.

Sarkar, J., and Bhattacharyya, Souvik, "Optimization of Recompression S-CO2 Power Cycle with Reheating" Energy Conversion and Management 50 (May 17, 2009), pp. 1939-1945.

(56) References Cited

OTHER PUBLICATIONS

Tom, Samsun Kwok Sun, "The Feasibility of Using Supercritical Carbon Dioxide as a Coolant for the Candu Reactor", The University of British Columbia, Jan. 1978, 156 pages.

VGB PowerTech Service GmbH, "CO2 Capture and Storage", A VGB Report on the State of the Art, Aug. 25, 2004, 112 pages.

Vidhi, Rachana, et al., "Study of Supercritical Carbon Dioxide Power Cycle for Power Conversion from Low Grade Heat Sources", Presentation, University of South Florida and Oak Ridge National Laboratory, Supercritical CO2 Power Cycle Symposium, May 24-25, 2011, Boulder, CO, 17 pages.

Vidhi, Rachana, et al., "Study of Supercritical Carbon Dioxide Power Cycle for Power Conversion from Low Grade Heat Sources", Paper, University of South Florida and Oak Ridge National Laboratory, Supercritical CO2 Power Cycle Symposium, May 24-25, 2011, Boulder, CO, 8 pages.

Wright, Steven A., et al., "Modeling and Experimental Results for Condensing Supercritical CO2 Power Cycles", Sandia Report, Jan. 2011, 47 pages.

Wright, Steven A., et al., "Supercritical CO2 Power Cycle Development Summary at Sandia National Laboratories", May 24-25, 2011, (1 page, Abstract only).

Wright, Steven, "Mighty Mite", Mechanical Engineering, Jan. 2012, pp. 41-43.

Yoon, Ho Joon, et al., "Preliminary Results of Optimal Pressure Ratio for Supercritical CO2 Brayton Cycle coupled with Small Modular Water Cooled Reactor", Presentation, Korea Advanced Institute of Science and Technology and Khalifa University of Science, Technology and Research, Boulder, CO, May 25, 2011, 18 pages.

Yoon, Ho Joon, et al., "Preliminary Results of Optimal Pressure Ratio for Supercritical CO2 Brayton Cycle coupled with Small Modular Water Cooled Reactor", Paper, Korea Advanced Institute of Science and Technology and Khalifa University of Science, Technology and Research, May 24-25, 2011, Boulder, CO, 7 pages.

\* cited by examiner

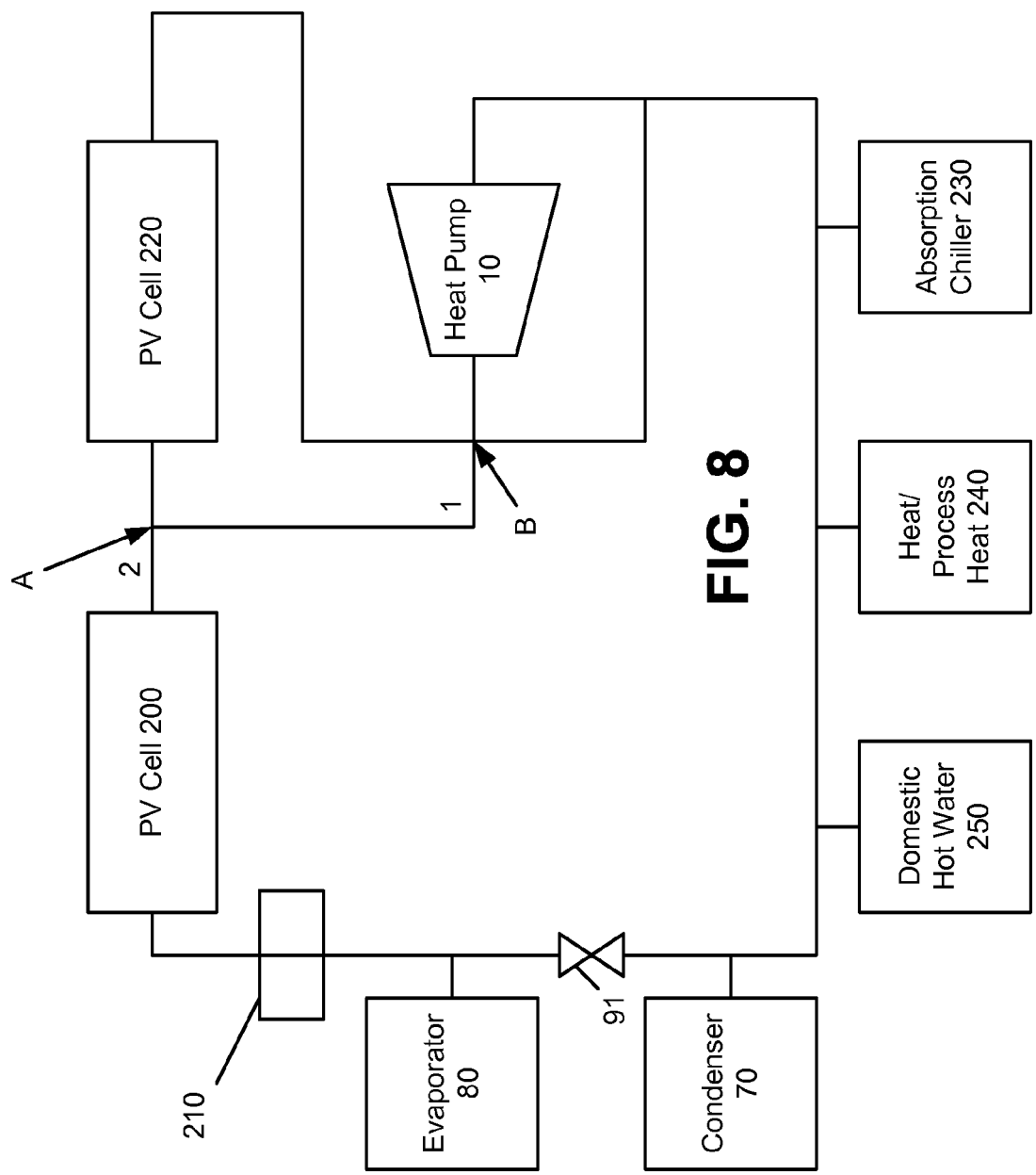

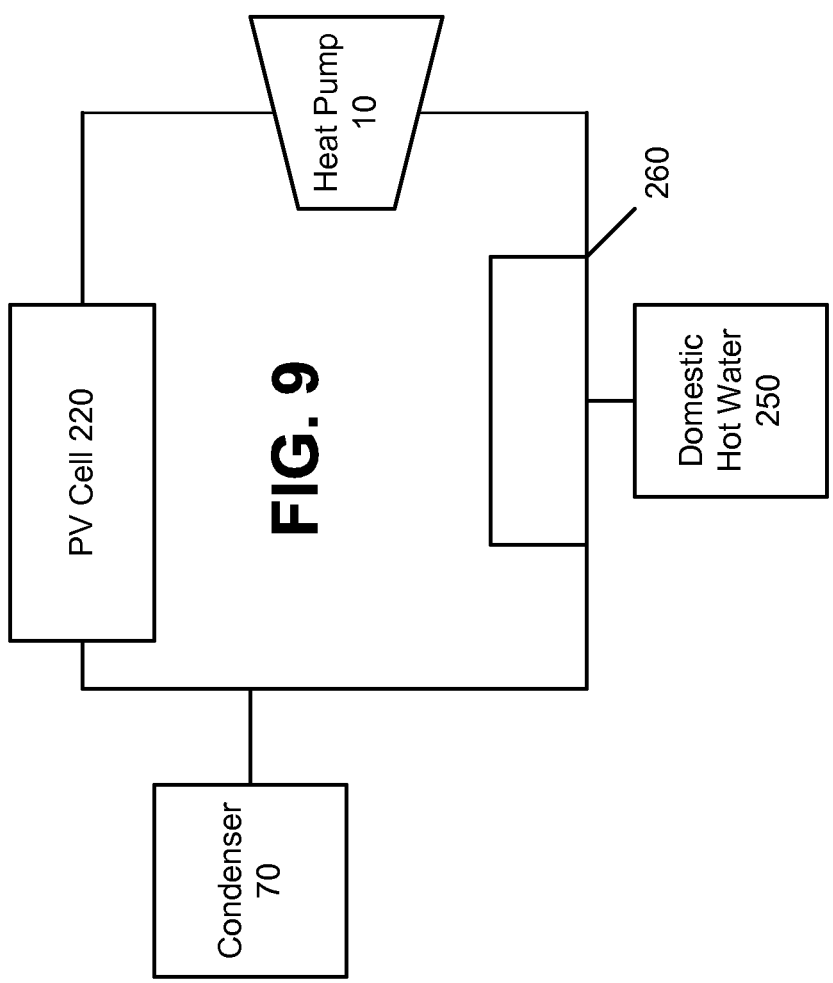

HEAT PUMP WITH INTEGRAL SOLAR COLLECTOR

RELATED APPLICATION DATA

This patent application claims priority to U.S. Provisional Patent Application No. 61/231,238, filed on Aug. 4, 2009 entitled "Heat Pump with Integral Solar Collector," the entirety of which is hereby incorporated by reference herein.

FIELD OF THE INVENTION

The present invention generally relates to highly integrated solar collector with a heat pump. In all embodiments, the present invention utilizes the same working fluid within the primary solar collector as the heat pump.

BACKGROUND OF THE INVENTION

Due to a variety of factors including, but not limited to, global warming issues, fossil fuel availability and environmental impacts, crude oil price and availability issues, alternative energy sources are becoming more popular today. One such source of alternative and/or renewable energy is solar energy. One such way to collect solar energy is to use a solar receiver to focus and convert solar energy into a desired form (e.g., thermal energy or electrical energy). Thermal energy harvested from the sun is known in the art to be utilized in absorption heat pumps, domestic hot water and industrial processes, power generating cycles through the heating of a secondary heat transfer fluid, power generating cycles through the direct heating of power generating working fluid such as steam, and for heating. Furthermore, it is recognized that a wide range of energy consumers can be supplied via electrical and/or thermal energy such as air conditioning, refrigeration, heating, industrial processes, and domestic hot water. Given this, solar collectors that function in efficient manners are desirable.

Traditional thermal activated processes effectively consider every unit of energy into the system. Furthermore by definition solar energy is a function of solar intensity and thus at the minimum is absent during the nighttime, unless significant thermal storage is utilized that is currently very expensive. Additionally, it recognized in the art that vapor compressor heat pumps have coefficients of performance "COP" substantially higher than absorption heat pumps. And hot water heaters utilizing vapor compressor driven heat pumps also have substantially higher COPs as compared to direct heating of hot water having COPs less than unity. In addition, traditional solar collectors, particularly flat panel collectors, are temperature constrained due in large part to declining efficiencies as a function of temperature and the degradation of the working fluid which is often a mixture of a glycol and water. Solar collectors typically fall into the category of pump driven working fluid circulation or thermosiphon that respectively have the deficiency of requiring a pump or orientation of solar collector with respect to the "condenser".

Heat pumps also have significant limitations that limit temperature including the requirement for oil lubrication that would suffer oxidative destruction at the higher temperatures desired within heat pumps. Additionally, the working fluid in virtually all refrigerants is significantly expandable across a wide operating temperature range.

The combined limitations of each individual component being the solar collector and the heat pump presents significant challenges that are further exasperated when high integration using the same working fluid for both devices is realized.

SUMMARY OF THE INVENTION

The present invention generally relates to highly integrated solar collector with a heat pump. In all embodiments, the present invention utilizes the same working fluid within the primary solar collector as the heat pump.

In one embodiment, the present invention relates to a heat pump system comprising: at least one working fluid; at least one heat pump having an inlet and an outlet designed to receive and utilize the at least one working fluid; at least one solar collector having an inlet and an outlet designed to receive and utilize the at least one working fluid, wherein the inlet of the at least one solar collector is in fluid communication via the at least one working fluid with the outlet of the at least one heat pump; and at least one thermal sink having an inlet and an outlet designed to receive and utilize the at least one working fluid, wherein the inlet of the at least one thermal sink is in fluid communication via the at least one working fluid with the outlet of the at least one solar collector, and wherein the outlet of the at least one thermal sink is in fluid communication via the at least one working fluid with the inlet of the at least one heat pump, wherein the heat pump system contains a first temperature sensor and a first pressure sensor in fluid communication with the at least one working fluid, the first temperature sensor and the first pressure sensor being located between the at least one heat pump and the at least one solar collector, wherein the heat pump system contains a second temperature sensor in fluid communication with the at least one working fluid, the second temperature sensor being located between the at least one solar collector and the least one thermal sink, and wherein the heat pump system contains a third temperature sensor in fluid communication with the at least one working fluid, the third temperature sensor being located between the at least one thermal sink and the at least one heat pump.

In another embodiment, the present invention relates to a heat pump system comprising: at least one working fluid; at least one heat pump having an inlet and an outlet designed to receive and utilize the at least one working fluid; at least one solar collector having an inlet and an outlet designed to receive and utilize the at least one working fluid, wherein the inlet of the at least one solar collector is in fluid communication via the at least one working fluid with the outlet of the at least one heat pump; at least one thermal sink having an inlet and an outlet designed to receive and utilize the at least one working fluid, wherein the inlet of the at least one thermal sink is in fluid communication via the at least one working fluid with the outlet of the at least one solar collector; at least one expander having an inlet and an outlet designed to receive and utilize the at least one working fluid, wherein the inlet of the at least one expander is in fluid communication via the at least one working fluid with the outlet of the at least one thermal sink; and at least one condenser having an inlet and an outlet designed to receive and utilize the at least one working fluid, wherein the inlet of the at least one condenser is in fluid communication via the at least one working fluid with the outlet of the at least one expander, and wherein the outlet of the at least one condenser is in fluid communication via the at least one working fluid with the inlet of the at least one heat pump, wherein the heat pump system contains a first temperature sensor and a first pressure sensor in fluid communication with the at least one working fluid, the first temperature sensor and the first pressure sensor being located between the at least one heat pump and the at least one solar collector, wherein the heat pump system contains a second temperature sensor in fluid communication with the at least one working fluid, the second temperature sensor being located between the at least one solar collector and the least one thermal sink, wherein the heat pump system contains a third temperature sensor in fluid communication with the at least one working fluid, the third temperature sensor being located between the at least one thermal sink and the at least one heat pump, and wherein the heat pump system contains a fourth temperature sensor and a second pressure sensor in fluid communication with the at least one working fluid, the fourth temperature sensor and the second pressure sensor being located between the at least one expander and the at least one condenser.

In still another embodiment, the present invention relates to a heat pump system comprising: at least one working fluid; at least one heat pump having an inlet and an outlet designed to receive and utilize the at least one working fluid; at least one solar collector having an inlet and an outlet designed to receive and utilize the at least one working fluid, wherein the inlet of the at least one solar collector is in fluid communication via the at least one working fluid with the outlet of the at least one heat pump; at least one thermal sink having an inlet and an outlet designed to receive and utilize the at least one working fluid, wherein the inlet of the at least one thermal sink is in fluid communication via the at least one working fluid with the outlet of the at least one solar collector; at least one expansion valve having an inlet and an outlet designed to receive and utilize the at least one working fluid, wherein the inlet of the at least one expansion valve is in fluid communication via the at least one working fluid with the outlet of the at least one thermal sink; and at least one evaporator having an inlet and an outlet designed to receive and utilize the at least one working fluid, wherein the inlet of the at least one evaporator is in fluid communication via the at least one working fluid with the outlet of the at least one expansion valve, and wherein the outlet of the at least one evaporator is in fluid communication via the at least one working fluid with the inlet of the at least one heat pump, wherein the heat pump system contains a first temperature sensor and a first pressure sensor in fluid communication with the at least one working fluid, the first temperature sensor and the first pressure sensor being located between the at least one heat pump and the at least one solar collector, wherein the heat pump system contains a second temperature sensor in fluid communication with the at least one working fluid, the second temperature sensor being located between the at least one solar collector and the least one thermal sink, wherein the heat pump system contains a third temperature sensor in fluid communication with the at least one working fluid, the third temperature sensor being located between the at least one thermal sink and the at least one heat pump, and wherein the heat pump system contains a fourth temperature sensor and a second pressure sensor in fluid communication with the at least one working fluid, the fourth temperature sensor and the second pressure sensor being located between the at least one expansion valve and the at least one evaporator.

In still another embodiment, the present invention relates to a heat pump system comprising: at least one working fluid; at least one heat pump having an inlet and an outlet designed to receive and utilize the at least one working fluid; at least one solar collector having an inlet and an outlet designed to receive and utilize the at least one working fluid, wherein the inlet of the at least one solar collector is in fluid communication via the at least one working fluid with the outlet of the at least one heat pump; at least one thermal sink having an inlet and an outlet designed to receive and utilize the at least one working fluid, wherein the inlet of the at least one thermal sink is in fluid communication via the at least one working fluid with the outlet of the at least one solar collector; at least one fluid accumulator having an inlet and an outlet designed to receive and utilize the at least one working fluid, wherein the inlet of the at least one fluid accumulator is in fluid communication via the at least one working fluid with the outlet of the at least one thermal sink; and at least one control valve having an inlet and an outlet designed to receive and utilize the at least one working fluid, wherein the inlet of the at least one control valve is in fluid communication via the at least one working fluid with the outlet of the at least one fluid accumulator, and wherein the outlet of the at least one control valve is in fluid communication via the at least one working fluid with the inlet of the at least one heat pump, wherein the heat pump system contains a first temperature sensor and a first pressure sensor in fluid communication with the at least one working fluid, the first temperature sensor and the first pressure sensor being located between the at least one heat pump and the at least one solar collector, wherein the heat pump system contains a second temperature sensor in fluid communication with the at least one working fluid, the second temperature sensor being located between the at least one solar collector and the least one thermal sink, and wherein the heat pump system contains a third temperature sensor in fluid communication with the at least one working fluid, the third temperature sensor being located between the at least one thermal sink and the at least one heat pump.

In still another embodiment, the present invention relates to a heat pump system comprising: at least one working fluid; at least one heat pump having an inlet and an outlet designed to receive and utilize the at least one working fluid; at least one solar collector having an inlet and an outlet designed to receive and utilize the at least one working fluid, wherein the inlet of the at least one solar collector is in fluid communication via the at least one working fluid with the outlet of the at least one heat pump; and at least one working fluid inventory storage system, wherein the at least one working fluid inventory storage system is in fluid communication with both the at least one heat pump and the at least one solar collector, wherein the at least one working fluid inventory storage system is designed to working in a bi-directional manner, and wherein the at least one working fluid inventory storage system comprises: at least one bi-directional expansion valve having an inlet and an outlet designed to receive and utilize the at least one working fluid, wherein the inlet of the at least one bi-directional expansion valve is in fluid communication via the at least one working fluid with both the outlet of the at least one heat pump and the inlet of the at least one solar collector; at least one bi-directional condenser having an inlet and an outlet designed to receive and utilize the at least one working fluid, wherein the inlet of the at least one bi-directional condenser is in fluid communication via the at least one working fluid with the outlet of the at least one bi-directional expansion valve; and at least one bi-directional fluid accumulator having an inlet and an outlet designed to receive and utilize the at least one working fluid, wherein the inlet of the at least one bi-directional fluid accumulator is in fluid communication via the at least one working fluid with the outlet of the at least one bi-directional condenser, wherein the heat pump system contains a first temperature sensor in fluid communication with the at least one working fluid, the first temperature sensor being located between the at least one heat pump and the at least one solar collector, wherein the heat pump system contains a second temperature sensor in fluid communication with the at least one working fluid, the second temperature sensor being located downstream of the at least one solar collector, wherein the heat pump system contains a third temperature sensor in fluid communication with the at least one working fluid, the third temperature sensor being located between the at least one bi-directional expansion valve and the at least one bi-directional fluid accumulator, and wherein the heat pump system contains a first pressure sensor in fluid communication with the at least one working fluid, the first pressure sensor being located between the at least one bi-directional expansion valve and the at least one bi-directional fluid condenser.

In still another embodiment, the present invention relates to a heat pump system comprising: at least one working fluid; at least one heat pump having an inlet and an outlet designed to receive and utilize the at least one working fluid; at least one solar collector having an inlet and an outlet designed to receive and utilize the at least one working fluid, wherein the inlet of the at least one solar collector is in fluid communication via the at least one working fluid with the outlet of the at least one heat pump via at least one first valve; at least one first thermal sink/condenser having an inlet and an outlet designed to receive and utilize the at least one working fluid, wherein the inlet of the at least one first thermal sink/condenser is in fluid communication via the at least one working fluid with the outlet of the at least one heat pump via at least one second valve; at least one fluid accumulator having an inlet and an outlet designed to receive and utilize the at least one working fluid, wherein the inlet of the at least one fluid accumulator is in fluid communication via the at least one working fluid with the outlet of the at least one heat pump via at least one third valve; at least one thermal sink/heat exchanger combination having an inlet and an outlet designed to receive and utilize the at least one working fluid, wherein the inlet of the at least one thermal sink/heat exchanger combination is in thermal communication, or fluid communication, via the at least one working fluid with the outlet of the at least one solar collector, and wherein the outlet of the at least one thermal sink/heat exchanger combination is in thermal communication, or fluid communication, via the at least one working fluid with the inlet of the at least one first thermal sink/condenser; and at least one second thermal sink/condenser having an inlet and an outlet designed to receive and utilize the at least one working fluid, wherein the inlet of the at least one second thermal sink/condenser is in fluid communication via the at least one working fluid with the outlet of the at least one first thermal sink/condenser, and wherein the inlet of the at least one second thermal sink/condenser is in fluid communication via the at least one working fluid with the outlet of the at least one fluid accumulator pump via at least one fourth valve.

In still another embodiment, the present invention relates to a heat pump system comprising: at least one working fluid; at least one heat pump having an inlet and an outlet designed to receive and utilize the at least one working fluid; at least one thermal sink having an inlet and an outlet designed to receive and utilize the at least one working fluid, wherein the inlet of the at least one thermal sink is in fluid communication via the at least one working fluid with the outlet of the at least one heat pump via at least one first valve; at least one heat exchanger/pump combination, wherein the at least one heat exchanger/pump combination is in thermal communication, or fluid communication, with the at least one thermal sink; at least one solar collector having an inlet and an outlet designed to receive and utilize the at least one working fluid, wherein the inlet of the at least one solar collector is in fluid communication via the at least one working fluid with the outlet of the at least one thermal sink; and at least one evaporator having an inlet and an outlet designed to receive and utilize the at least one working fluid, wherein the inlet of the at least one evaporator is in fluid communication via the at least one working fluid with the outlet of the at least one solar collector via at least one second valve, and wherein the outlet of the at least one evaporator is in fluid communication via the at least one working fluid with the inlet of the at least one heat pump, wherein the heat pump system contains a first temperature sensor and a first pressure sensor in fluid communication with the at least one working fluid, the first temperature sensor and the first pressure sensor being located between the at least one heat pump and the at least thermal sink, wherein the heat pump system contains a second temperature sensor in fluid communication with the at least one working fluid, the second temperature sensor being located between the least one thermal sink and the at least one solar collector, wherein the heat pump system contains a third temperature sensor in fluid communication with the at least one working fluid, the third temperature sensor being located between the at least one solar collection and the at least one evaporator, and wherein the heat pump system contains a fourth temperature sensor and a second pressure sensor in fluid communication with the at least one working fluid, the fourth temperature sensor and the second pressure sensor being located between the at least one evaporator and the at least one heat pump.

In still another embodiment, the present invention relates to a heat pump system comprising: at least one working fluid; at least one heat pump designed to receive and utilize the at least one working fluid; at least one thermal sink designed to receive and utilize the at least one working fluid, wherein the at least one thermal sink is in fluid communication via the at least one working fluid with the at least one heat pump via at least one first bi-directional valve; at least one solar collector designed to receive and utilize the at least one working fluid, wherein the at least one solar collector is in fluid communication via the at least one working fluid with the at least one thermal sink via a bi-directional connection, and wherein the at least one solar collection is in fluid communication via the at least one working fluid with the at least one heat pump via the first bi-directional valve; and at least one evaporator designed to receive and utilize the at least one working fluid, wherein the at least one evaporator is in fluid communication via the at least one working fluid with both the at least one thermal sink and the at least one solar collector via the combination of at least one second bi-directional valve and at least one valve, and wherein the at least one evaporator is in fluid communication via the at least one working fluid with the at least one heat pump.

In still another embodiment, the present invention relates to a heat pump system comprising: at least one working fluid; at least one heat pump designed to receive and utilize the at least one working fluid; at least one solar collector designed to receive and utilize the at least one working fluid, wherein the at least one solar collector is in fluid communication via the at least one working fluid with the at least heat pump via at least one first valve; at least one liquid desiccant generator/heat exchanger combination designed to receive and utilize the at least one working fluid, wherein the at least one liquid desiccant generator/heat exchanger combination is in thermal communication, or fluid communication, via the working fluid with the at least one solar collector; at least one condenser designed to receive and utilize the at least one working fluid, wherein the at least one condenser is in fluid communication via the at least one working fluid with the at least one heat pump via at least one second valve, and wherein the at least one condenser is in thermal communication, or fluid communication, via the working fluid with the at least one liquid desiccant generator/heat exchanger combination; at least one fluid accumulator designed to receive and utilize the at least one working fluid, wherein the at least one fluid accumulator is in fluid communication via the at least one working fluid with the at least one condenser via at least one third valve; at least one geothermal heat sink/heat exchanger combination designed to receive and utilize the at least one working fluid, wherein the at least one geothermal heat sink/heat exchanger combination is in thermal communication, or fluid communication, via the at least one working fluid with the at least one condenser, and wherein the at least one geothermal heat sink/heat exchanger combination is in thermal communication, or fluid communication, via the at least one working fluid with the at least one fluid accumulator via at least one third valve; and at least one evaporator designed to receive and utilize the at least one working fluid, wherein the at least one evaporator is in thermal communication, or fluid communication, via the at least one working fluid with the at least one geothermal heat sink/heat exchanger combination via at least one fourth valve, and wherein the at least one evaporator is in fluid communication via the at least one working fluid with the at least one heat pump.

In still another embodiment, the present invention relates to a heat pump system comprising: at least one working fluid; an upper loop comprising: at least one pump; at least one solar collector; at least one turbine; and at least one condenser, wherein the at least one pump, the at least one solar collector, the at least one turbine and the at least one condenser are all designed to receive and utilize the at least one working fluid and are all in fluid communication via the at least one working fluid and together form the upper loop; and a lower loop comprising: at least one heat pump; at least one condenser; at least one evaporator, wherein the at least one heat pump, the at least one condenser and the at least one evaporator are all designed to receive and utilize the at least one working fluid and are all in fluid communication via the at least one working fluid and together form the lower loop, and wherein the bottom loop is in fluid communication with the top loop via at least two valves.

In still another embodiment, the present invention relates to a heat pump system comprising: at least one working fluid; at least two photovoltaic cells; at least one heat pump; at least one absorption chiller; at least one process heat unit; at least one hot water device; at least one condenser; and at least one evaporator, wherein the at least two photovoltaic cells, the at least one heat pump, the at least one absorption chiller, the at least one process heat unit, the at least one hot water device, the at least one condenser and the at least one evaporator are all designed to receive and utilize the at least one working fluid and are all in fluid communication, or thermal communication, via the at least one working fluid, or a combination of the at least one working fluid and at least heat exchanger, and wherein the heat pump system has a by-pass circuit designed to permit the control of the heat pump system when no cooling is needed.

In still another embodiment, the present invention relates to a heat pump system comprising: at least one working fluid; at least one photovoltaic cell; at least one heat pump; at least one hot water device; and at least one condenser, wherein the at least one photovoltaic cell, the at least one heat pump, the at least one hot water device and the at least one condenser are all designed to receive and utilize the at least one working fluid and are all in fluid communication, or thermal communication, via the at least one working fluid, or a combination of the at least one working fluid and at least heat exchanger, and wherein the heat pump system has a by-pass circuit designed to permit the by-pass of the at least one hat water device.

BRIEF DESCRIPTION OF THE DRAWINGS

FIG. 8 is an illustration of one embodiment of an integrated solar collector and heat pump having multiple thermal sinks and an integrated photovoltaic cell in accordance with the present invention; and FIG. 9 is an illustration of one embodiment of an integrated solar collector and heat pump configured as a domestic hot water system in accordance with the present invention.

DETAILED DESCRIPTION OF THE INVENTION

Figure 1A:
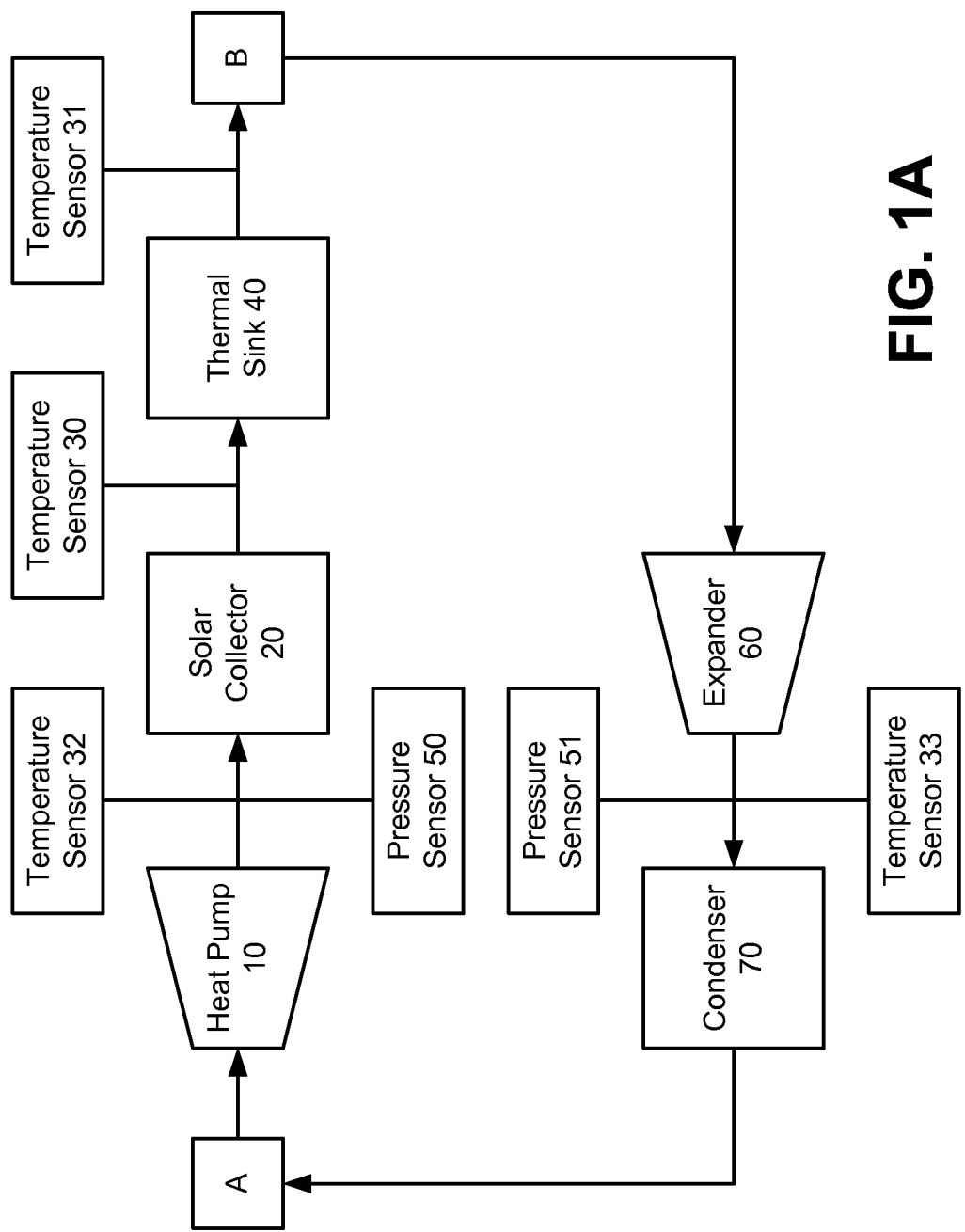
FIGS. 1A through 1D are illustrations of various embodiments of an integrated solar collector and heat pump system in accordance with the present invention.

The present invention generally relates to highly integrated solar collector with a heat pump. In all embodiments, the present invention utilizes the same working fluid within the primary solar collector as the heat pump.

As used herein, the term "non-linear", as used herein, includes any surface of a solar receiver whose surface shape is described by a set of nonlinear equations. As used herein, the term "microchannel", as used herein, includes channel dimensions of less than 2 millimeter. As used herein, the term "reflector", as used herein, includes a surface or surface coating that reflects greater than 50% of at least one portion of the incoming light spectrum, which includes the portions of visible, infrared, and ultraviolet.

As used herein, the term "in thermal continuity" or "thermal communication" includes the direct connection between the heat source and the heat sink whether or not a thermal interface material is used. As used herein, the term "multi-pass", "multi-pass", or "multiple passes" includes a fluid flow into at least one portion of a heat exchanger and out of at least one other portion of a heat exchanger wherein the at least one portion of the heat exchanger and the at least one other portion of a heat exchanger can either be thermally isolated from each other or in thermal continuity with each other.

As used herein, the term "fluid inlet" or "fluid inlet header" includes the portion of a heat exchanger where the fluid flows into the heat exchanger. As used herein, the term "fluid discharge" includes the portion of a heat exchanger where the fluid exits the heat exchanger. As used herein, the term "boiler" includes a heat exchanger transferring thermal energy into a working fluid wherein the working fluid is comprised of at least 5% vapor phase. As used herein, the term "superheater" includes a heat exchanger transferring thermal energy into a working fluid wherein the heat exchanger is used to convert saturated steam into dry steam.

In one embodiment, the present invention generally relates to a heat pump system having an integral solar collector that utilizes one working fluid in common between the two elements. Here, as well as elsewhere in the specification and claims, individual numerical values and/or individual range limits can be combined to form non-disclosed ranges.

The heat transfer fluid within the embodiments is, in one embodiment, a supercritical fluid as a means to reduce the pressure drop within the heat exchanger. The supercritical fluid includes fluids selected from the group of organic refrigerants (e.g., R134, R245, pentane, butane), gases (e.g., $CO_2$, $H_2O$, $He_2$), or any suitable combination of two or more thereof. In another embodiment, the supercritical fluid is devoid of hydrogen as a means to virtually eliminate hydrogen reduction or hydrogen embrittlement on the heat exchanger coatings or substrate respectively. By devoid of hydrogen, it is meant that the supercritical fluid has less than about 5 weight percent hydrogen (be it either free, or bound, hydrogen, or the combination of both), less than about 2.5 weight percent hydrogen, less than about 1 weight percent hydrogen, less than about 0.5 weight percent hydrogen, less than about 0.1 weight percent hydrogen, or even zero weight percent hydrogen.

In still another embodiment, the supercritical fluid has a disassociation rate less than 0.5 percent at the operating temperature in which the heat exchanger operates. In still yet another embodiment, the heat transfer fluid is a working fluid wherein the combined energy produced (i.e., both thermal, and electrical) displaces the maximum amount of dollar value associated with the displaced energy produced within all of the integrated components including thermodynamic cycle operable within a power generating cycle, vapor compression cycle, heat pump cycle, absorption heat pump cycle, or thermochemical heat pump cycle.

All of the embodiments can be further comprised of a control system operable to regulate the mass flow rate of the working fluid into the solar receiver, with the ability to regulate the mass flow rate independently for each pass by incorporating a fluid tank having variable fluid levels optionally interspersed between at least one pass and the other. One method of control includes a working fluid inventory management system. The control system regulates the mass flow rate through methods known in the art including variable speed pump, variable volume valve, bypass valves, and fluid accumulators. The control system is further comprised of at least one temperature sensor for fluid discharge temperature and at least one temperature sensor for ambient air temperature or condenser discharge temperature.

Exemplary embodiments of the present invention will now be discussed with reference to the attached Figures. Such embodiments are merely exemplary in nature and not to be construed as limiting the scope of the present invention in any manner. The depiction of heat exchangers predominantly as microchannel heat exchangers having linear porting is merely exemplary in nature and can be replaced with any suitably shaped heat exchanger containing microchannels with dimensions or porting greater than defined by microchannel practice. The depiction of solar collectors predominantly as flat panel non-tracking solar absorbers with integral microchannel heat exchangers is merely exemplary in nature and can be replaced with tracking collectors of 1-axis or 2-axis type, vacuum evacuated tubes or panels, switchable configuration between solar absorber or solar radiator mode, low concentration fixed collector, or high concentration tracking collectors.

The depiction of a heat pump as a vapor compressor device is merely exemplary and can such a heat pump could be replaced with an absorption heat pump. The compressor type can include a positive displacement device, a gerotor, a ramjet, a screw, and a scroll. Furthermore, and importantly, the heat pump can be a turbo pump, a positive displacement pump where the selection of the device to increase the working fluid pressure and operate as a mass flow regulator is determined by the density at the inlet pressure and discharge outlet. In one embodiment, the incoming working fluid has a density greater than about 50 kg per $m^3$, or greater than about 100 kg per $m^3$, or even greater than about 300 kg per $m^3$.

The depiction of valves as standard mass flow regulators is merely exemplary in nature and any such valves can independently be substituted with one or more variable flow devices, expansion valves, turbo-expanders, two-way or three-way valves. The depiction of methods to remove heat from the working fluid as a condenser is merely exemplary in nature as a thermal sink and can be substituted by any device having a temperature lower than the working fluid temperature including absorption heat pump desorber/generator, process boilers, process superheater, and domestic hot water.

The depiction of desiccant dehumidifier as liquid desiccant dehumidifier is merely exemplary and can be substituted with an adsorption solid desiccant dehumidifier and/or high surface area hydrophilic powders. The depiction of geothermal as thermal source can be low depth subsurface, moderate depth geothermal wells, or high depth geothermal sources such as obtained from oil wells. The depiction of expander as turbine is merely exemplary as a method to reduce the pressure of the working fluid enables the generation of mechanical or electrical energy and can be substituted with turbo-expander, positive displacement device, a gerotor or geroller, a ramjet, screw, or scroll device. The depiction of photovoltaic cell as single concentration device can be substituted with a thin film, low concentration device, Fresnel lens, and high concentration devices. With regard to FIGS. 1 through 9, like reference numerals refer to like parts.

Turning to FIGS. 1A through 1D, FIGS. 1A through 1D represent sequential flow diagrams of one embodiment, and various modifications thereto, of a heat pump with integral solar collector in accordance with the present invention. In the embodiments of FIGS. 1A through 1D heat pump solar collector comprises heat pump 10 in fluid communication with a solar collector 20 with a temperature sensor 32 measuring the discharge temperature of the working fluid from heat pump 10. Another temperature sensor 30 measures the discharge temperature of the working fluid as it leaves solar collector 20 and prior to the fluid entering a thermal sink 40 which is in fluid communication with solar collector 20. Another temperature sensor 31 measures the discharge temperature after leaving thermal sink 40. A pressure sensor 50 measures the discharge pressure from heat pump 10, though the actual placement of pressure sensor 50 can be anywhere downstream of heat pump 10 discharge and upstream of a pressure-reducing device including, for example, an expansion valve or turbo expander.

One exemplary method of control is to vary the discharge pressure of heat pump 10 such that the temperature of the working fluid being discharged after the solar collector, which enables the heat pump energy input to be minimized where heat pump 10 concurrently achieves the desired working fluid mass flow requirement and discharge temperature prior to the solar collector. The discharge pressure downstream of heat pump 10 is a function of the solar flux on solar collector 20 as a method of minimizing the operating costs of the heat pump with integral solar collector as the heat pump requires mechanical and/or electrical energy. The heat of compression resulting from heat pump 10 provides a high coefficient of performance temperature gain (i.e., lift) that is subsequently increased further by solar collector 20. The control system decreases the pressure gain to ensure that thermal sink 40 both achieves the required heat transfer and discharge temperature such that heat pump 10, when solar collector 20 provides the majority of the heat source into the working fluid, operates predominantly as a mass flow regulator resulting in a reduced operating cost of heat pump 10. Another advantage of this embodiment is the elimination of a heat exchanger to transfer thermal energy captured from solar collector 20 into the working fluid, and also eliminating a secondary heat transfer fluid within solar collector 20. In one embodiment, the working fluid is a fluid that has virtually no (e.g., less than about 1.0 percent, less than about 0.5 percent, and even less than about 0.05 percent) thermal degradation resulting particularly from solar collector stagnation. One exemplary working fluid includes carbon dioxide, with one embodiment employing a heat pump discharge pressure greater than the supercritical pressure of carbon dioxide. Additional working fluids include refrigerants, water, and gases.

In another embodiment, carbon dioxide with a discharge pressure greater than it's supercritical pressure is utilized in conjunction with solar collector 20 being a microchannel device to achieve superior heat transfer with low pressure drops. Another important design advantage is the selection of a heat pump 10 that either operates oil free, thus eliminating the potential of hydraulic oil from disassociating (i.e., breaking down) within, or due to, solar collector 20. Alternatively heat pump 10 can utilize an electrostatic collector to collect any lubricant utilized within heat pump 10, with one exemplary being ionic liquids. An ionic liquid has the further advantage of having essentially no vapor pressure in combination of having electrostatic attraction as a method of limiting heat pump 10 lubricant from entering solar collector 20. FIGS. 1A through 1D illustrate four alternative configurations such that "A" is the inlet of the working fluid into heat pump 10, and "B" is the discharge of the working fluid downstream of thermal sink 40. The first configuration, FIG. 1A, depicts an expander 60 downstream of thermal sink 40 as a method of recovering at least a portion of the mechanical/ electrical energy expended during in order to obtain the heat pump compression. This configuration would be typical for domestic hot water, air conditioning, refrigeration, industrial processes including processes currently serviced by traditional combustion powered boilers, furnaces, dryers, etc. Expander 60's discharge pressure is regulated by using feedback on the measured pressure by pressure sensor 50 and discharge temperature as measured by temperature sensor 33. It is further anticipated that an external combustor can be downstream of solar collector 20 and upstream of thermal sink 40 as a method to further increase the working fluid temperature. This configuration is especially desired for industrial or power generation processes that involve heating of air (i.e., less dense than working fluid thus requiring significantly larger heat exchangers) as a method of superheating the working fluid to the desired operating temperature of thermal sink 40. In the embodiment where the present invention utilizes the same working fluid for the heat pump as the solar collector in the case of instances where temperatures exceed about 350° C., only certain types of working fluids can be utilized. Suitable working fluids in this instance include, but are not limited to, ammonia, carbon dioxide and water. Water, although an possible choice, is less desirable due to the discontinuous thermophysical properties as water transitions to steam.

Figure 1B:
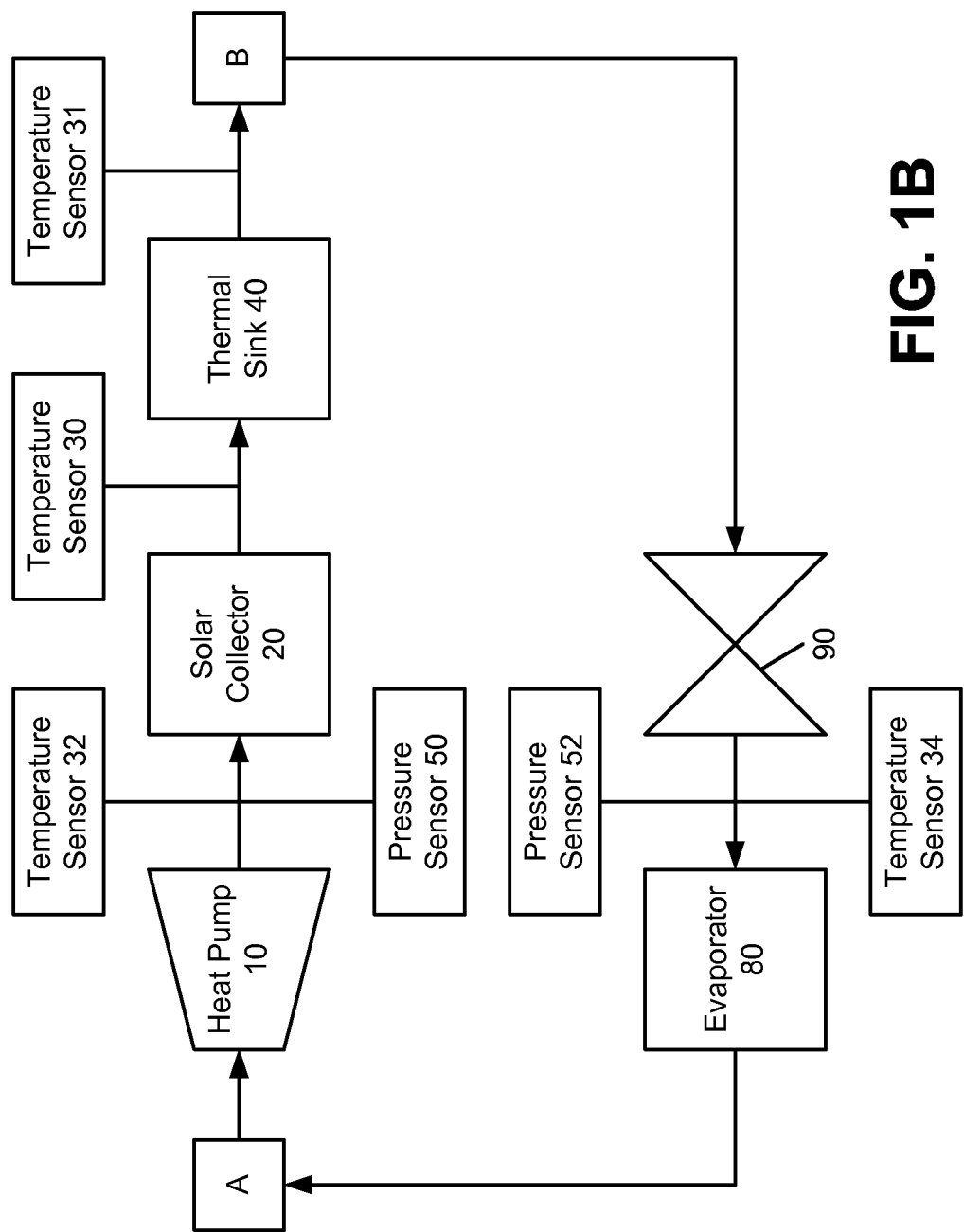

In FIG. 1B another configuration replaces the expander with an expansion valve 90 where the expansion valve as known in the art can operate as a variable controlled device, open/close switch, and modulated to be a pulsing device to enhance heat transfer properties. Expansion valve 90's discharge pressure is regulated using feedback on the measured pressure by pressure sensor 52 and discharge temperature as measured by temperature sensor 34. This configuration, though not as efficient as that of FIG. 1A. has a lower capital cost thus being implemented when the system scale or financial return on investment doesn't justify the additional expense of an energy recovery expander 60. The working fluid downstream of the expansion valve provides cooling through an evaporator 80 thus operating as an air conditioner, chiller, refrigerator, or freezer which is dependent on the discharge temperature as measured by temperature sensor 34.

Figure 1C:
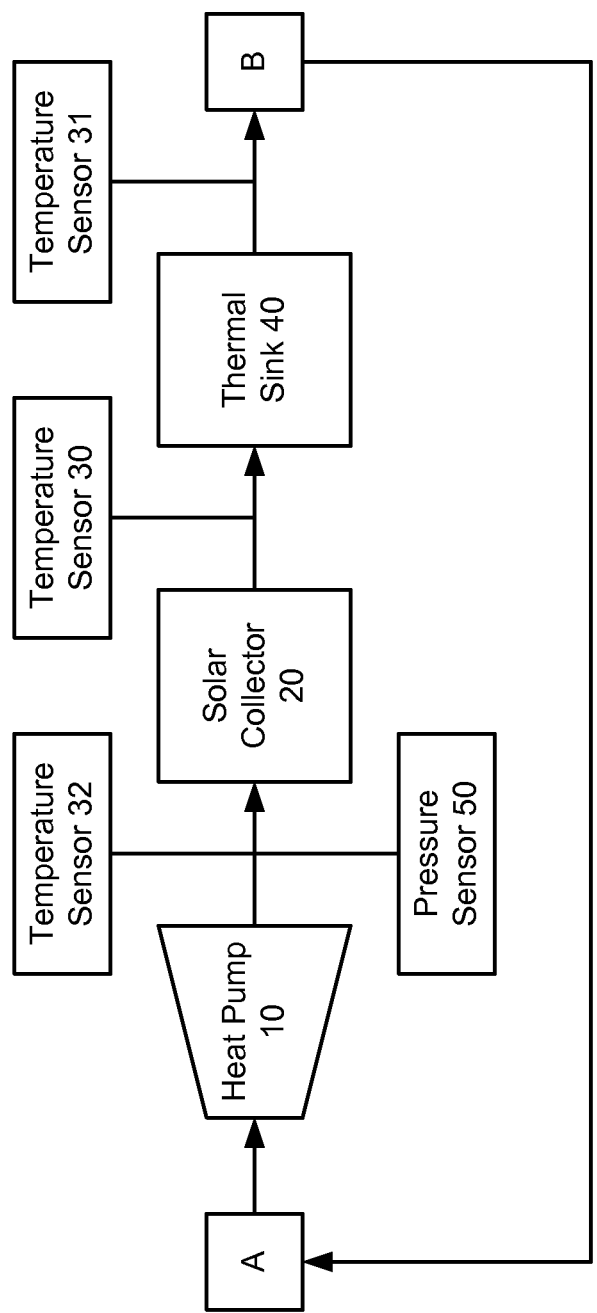
Figure 1D:
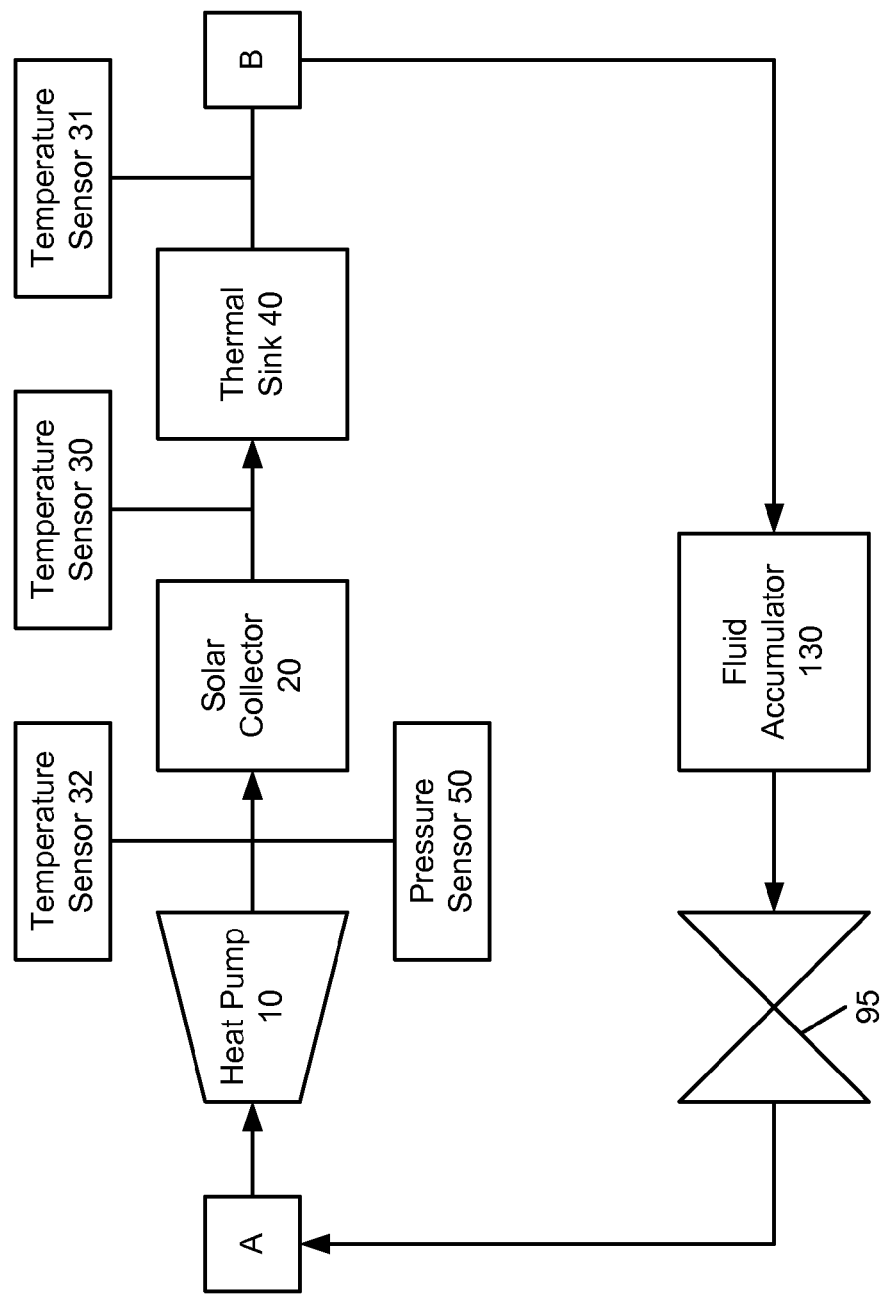

In FIG. 1C still another configuration is illustrated where a closed loop is utilized, such that the heat pump effectively operates as a mass flow regulator whereby the pressure gain between heat pump 10 inlet is a nominal amount solely to overcome pressure losses associated with the working fluid passing through the entire circulation loop including solar collector 20. In FIG. 1D still another configuration is illustrated where a system further comprises a fluid accumulator 130 and a control valve 95 as a method to buffer the inventory of working fluid within the circulation loop. Fluid accumulator 130 in its simplest form operates as a temporary storage of working fluid when the operating pressure within the circulation loop is within 10 psi of the maximum operating pressure of any individual component. In one embodiment, the present invention incorporates a control system to open and close the one or more valves of the system of FIG. 1D. In still another embodiment, the portion of FIG. 1D composed of fluid accumulator 130 and control valve 95 can be utilized in conjunction with any one of the embodiments of FIGS. 1A through 1C.

Figure 2:
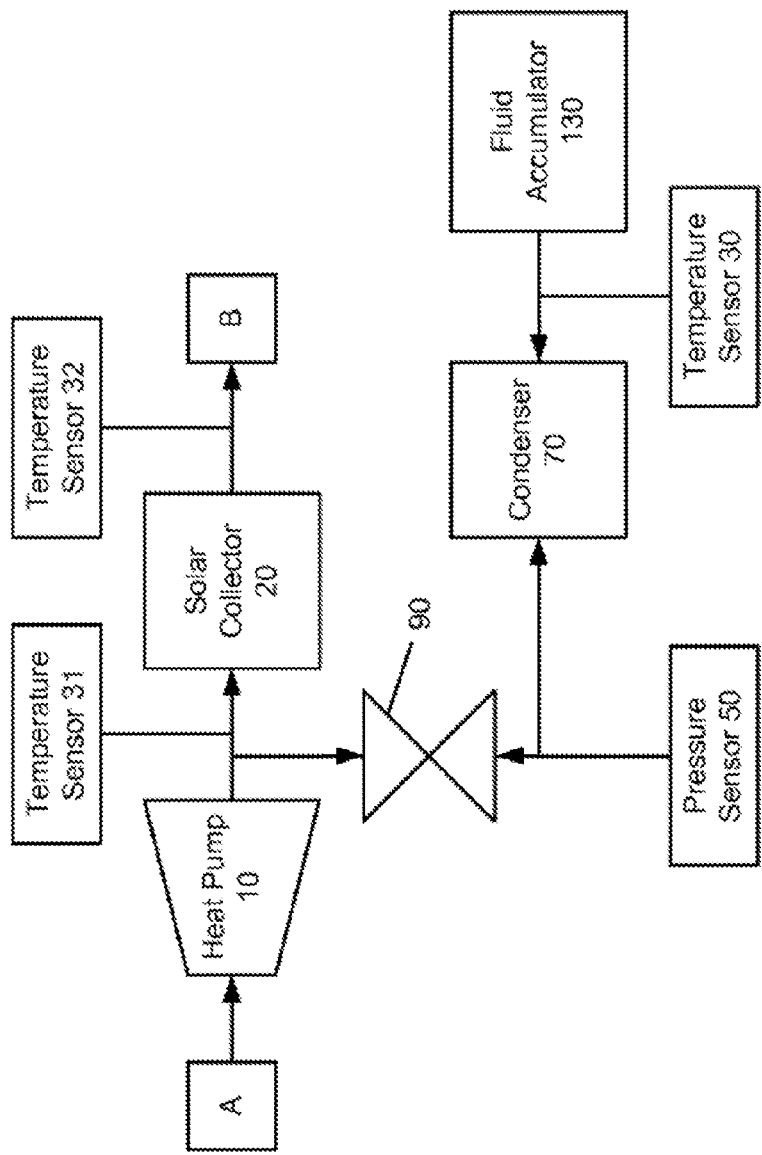
FIG. 2 is an illustration of one embodiment of an integrated solar collector and heat pump having a supplemental fluid accumulator in accordance with the present invention.

Turning to FIG. 2, FIG. 2 is a sequential flow diagram of one embodiment of a heat pump with integral solar collector in accordance with the present invention. In the embodiment of FIG. 2, the system further comprises a fluid accumulator 130 configured predominantly as an emergency working fluid inventory storage vehicle where an open/close valve 90 enables a partial stream of the working fluid, which is now at the higher pressure as measured by pressure sensor 50 having a temperature as measured by temperature sensor 31. The working fluid passes through a condenser 70 in order to increase the density of the working fluid prior to entering fluid accumulator 130. In one embodiment, condenser 70 is located within fluid accumulator 130, thus enabling the condenser (effectively a heat exchanger) to operate as an evaporator/heater. The control system would switch the condenser from cooling to heating mode once the heat pump discharge pressure (i.e., working fluid pressure downstream of the heat pump discharge) drops to an amount lower than the maximum operating pressure minus an anti-cycling threshold. The control system would then subsequently open valve 90 once the working fluid within fluid accumulator 130 exceeds the target set point as measured by temperature sensor 30.

Figure 3:
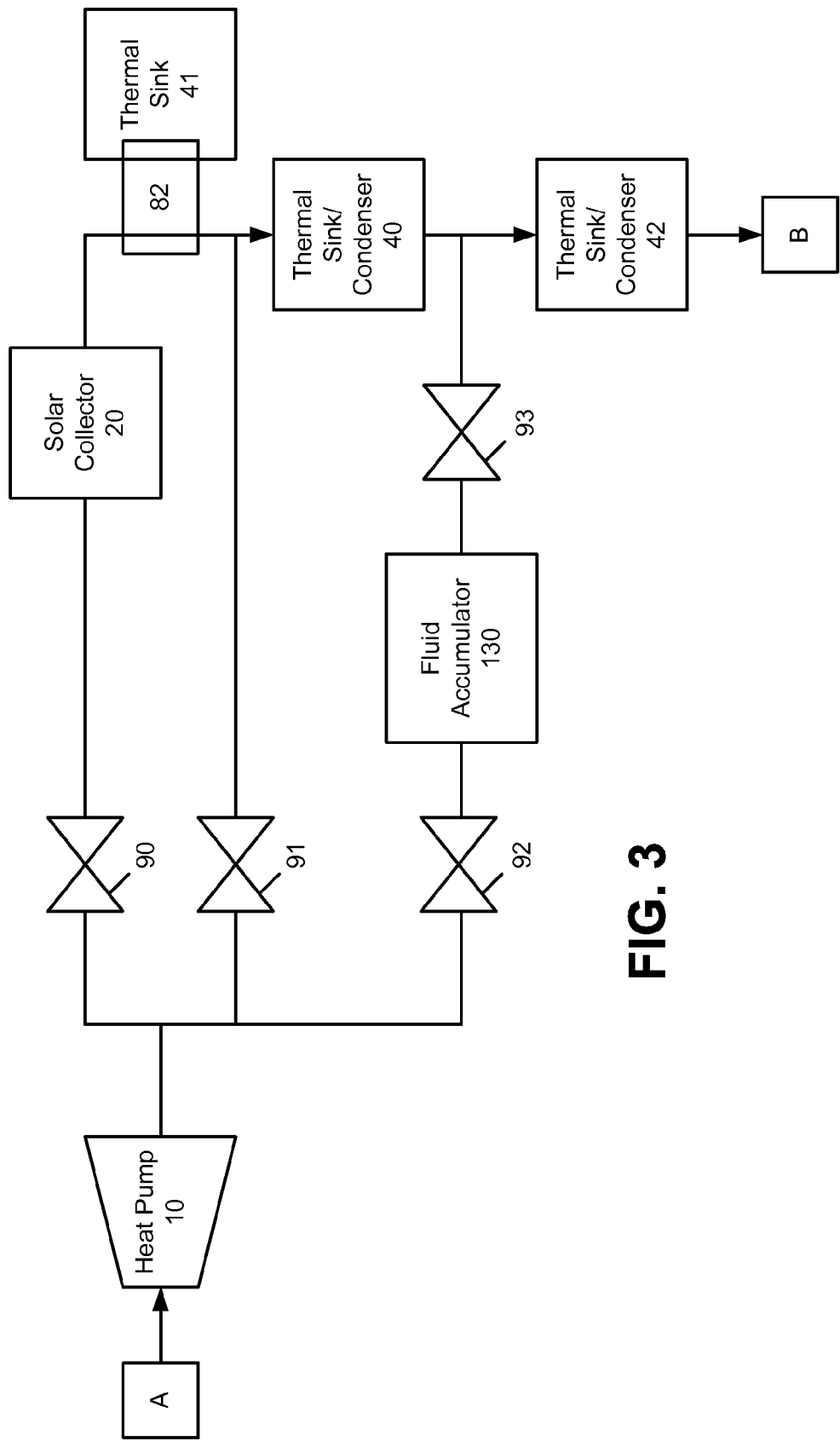
FIG. 3 is an illustration of one embodiment of an integrated solar collector and heat pump having multiple thermal sinks in accordance with the present invention.

Turning to FIG. 3, FIG. 3 is a sequential flow diagram of one embodiment of a heat pump with integral solar collector in accordance with the present invention. In the embodiment of FIG. 3 heat pump solar collector depicts one scenario having parallel circuits and multiple thermal sinks. Heat pump 10, as noted earlier, can operate as mass flow regulator (i.e., booster pump), more traditional vapor compressor, or more traditional turbo pump. A control system operates the valves as a method of controlling the mass flow within each parallel circuit. The top circuit is controlled by valve 90 to enable the working fluid to pass through solar collector 20. The invention contemplates and encompasses solar collector 20 operating either as a solar absorber or solar radiator thus providing the ability to provide "free" heating or cooling respectively by leveraging the high surface area. The working fluid downstream of the solar collector transfers thermal energy via a heat exchanger 80, which can be manufactured using a wide range of materials (e.g., conductive polymers, aluminum, stainless steel, etc.) and designed using methods known in the art (e.g., microchannel, shell and tube, plate, etc.), into thermal sink 41. The working fluid downstream of heat exchanger 82 mixes with working fluid that passes through valve 91, thus effectively operating as a solar collector bypass valve, and sequentially passes through a second thermal sink 40 that has a lower target set point than thermal sink 41. Another thermal sink 42 as illustrated in FIG. 3 removes more thermal energy from the working fluid, though the working fluid temperature will be at a lower temperature than the two aforementioned thermal sinks 41 and 40. Valve 92 enables working fluid to enter fluid accumulator 130. The full working features as noted in FIG. 2 are not repeated visually for the purpose of brevity.

Figure 4:
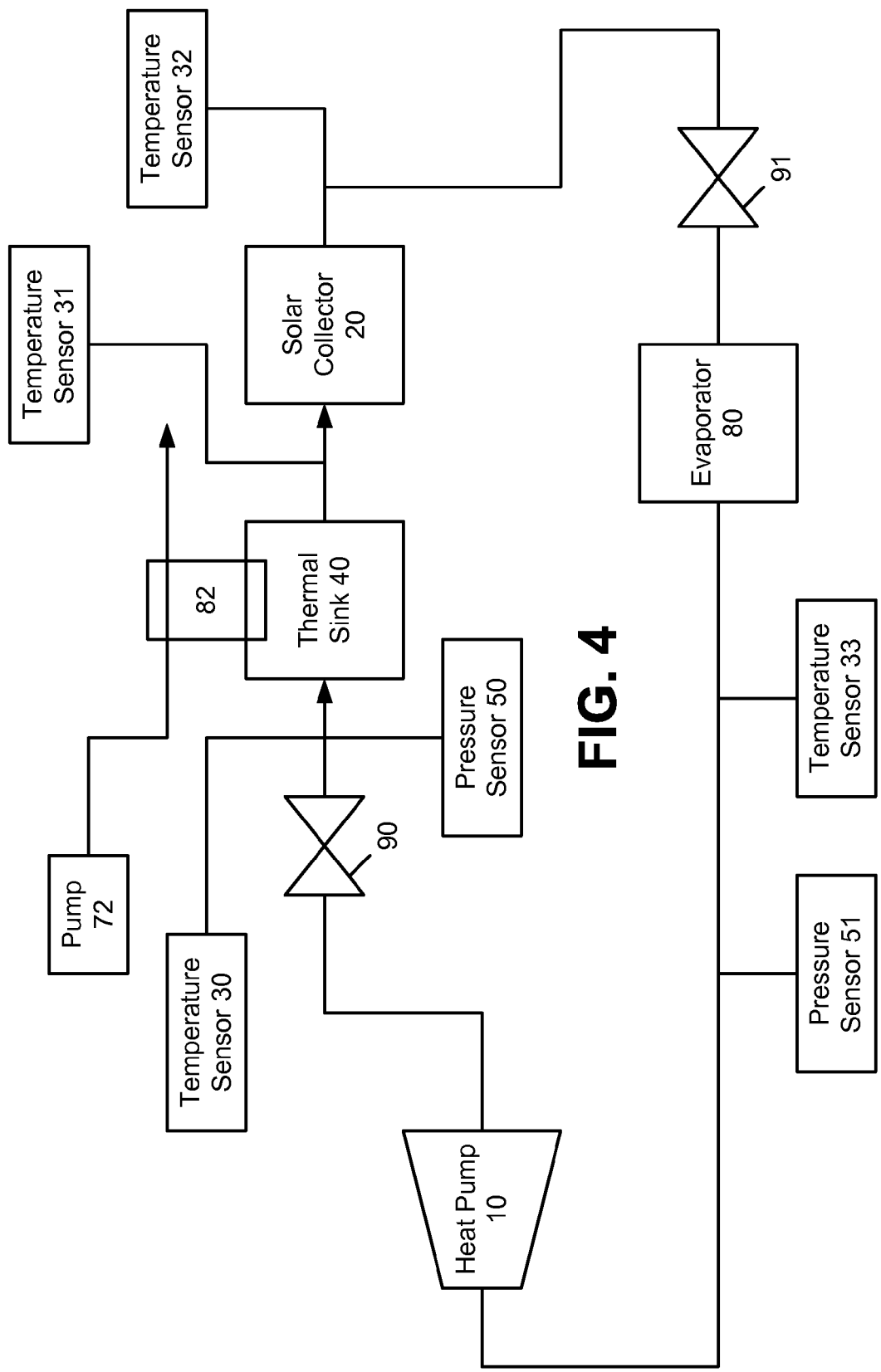
FIG. 4 is an illustration of one embodiment of an integrated solar collector and heat pump operating as a radiant cooler in accordance with the present invention.

Turning to FIG. 4, FIG. 4 is a sequential flow diagram of one embodiment of a heat pump with integral solar collector in accordance with the present invention. In the embodiment of FIG. 4 heat pump solar collector operates as a radiant cooler. A heat pump 10 increases the operating pressure as measured by the pressure sensor 50 of the working fluid which also has its temperature increased due to heat of compression as measured by temperature sensor 30. A secondary heat transfer fluid, such as domestic hot water is circulated by a pump 72 through a heat exchanger 80 to remove thermal energy of the working fluid through a thermal sink 40. This serves the purpose of providing the first stage of cooling prior to reaching solar collector 20 configured in the radiant cooling mode. The inlet temperature into solar collector 20 is measured by temperature sensor 31 and the discharge temperature is measured by temperature sensor 32. Solar collector 20 when operating as a radiant cooler dissipates black body radiation to the sky and therefore effectively operates as a pre-cooler/sub-cooler to the working fluid prior to reaching expansion valve 91. The now expanded working fluid provides cooling that absorbs thermal energy from a thermal source in thermal communication with evaporator 80. Heat pump 10 inlet pressure and temperature are measured respectively by pressure sensor 51 and temperature sensor 33. An alternate configuration for thermal sink 40 is accomplished using an air condenser that contains one or more condenser fans instead of a secondary heat transfer fluid.

Figure 5:
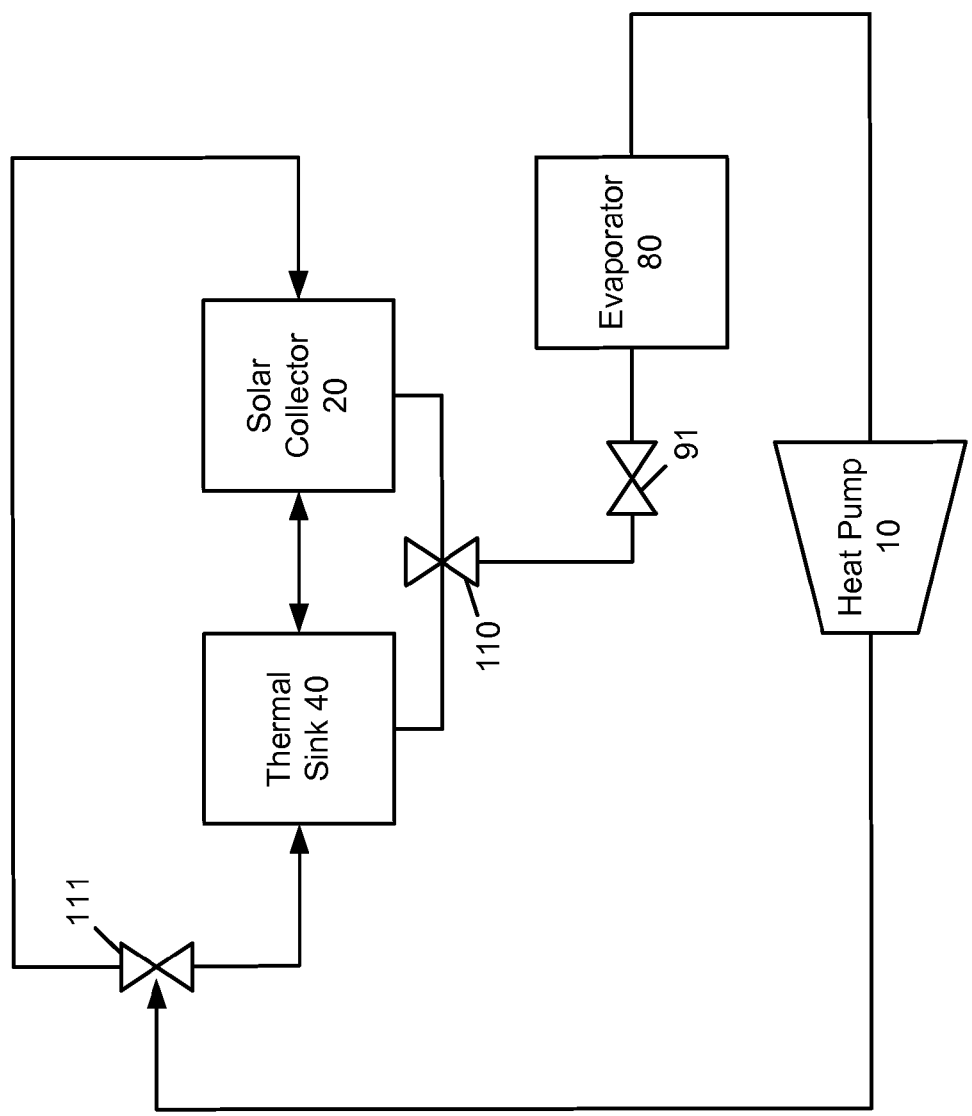
FIG. 5 is an illustration of one embodiment of an integrated solar collector switchable as a thermal source or sink, and heat pump in accordance with the present invention.

Turning to FIG. 5, FIG. 5 is a sequential flow diagram of one embodiment of a heat pump with integral solar collector in accordance with the present invention. In the embodiment of FIG. 5 heat pump solar collector depicts another configuration for switching solar collector 20 between a thermal sink 40 and thermal source mode. In this configuration, the solar collector is optionally under vacuum while operating in thermal source mode and has ambient air flowing over solar collector 20's surface area. The working fluid then subsequently passes through thermal sink 40. Two two-way valves 111 and 110 are depicted to switch fluid flow direction such that the heat pump can operate in air conditioning or heating mode, known in the art as a reversible heat pump. Heat pump 10 has common evaporator 80 and expansion valve 91 (alternatively expander) and condenser (which is depicted as either thermal sink 40 or solar collector 20).

Figure 6:
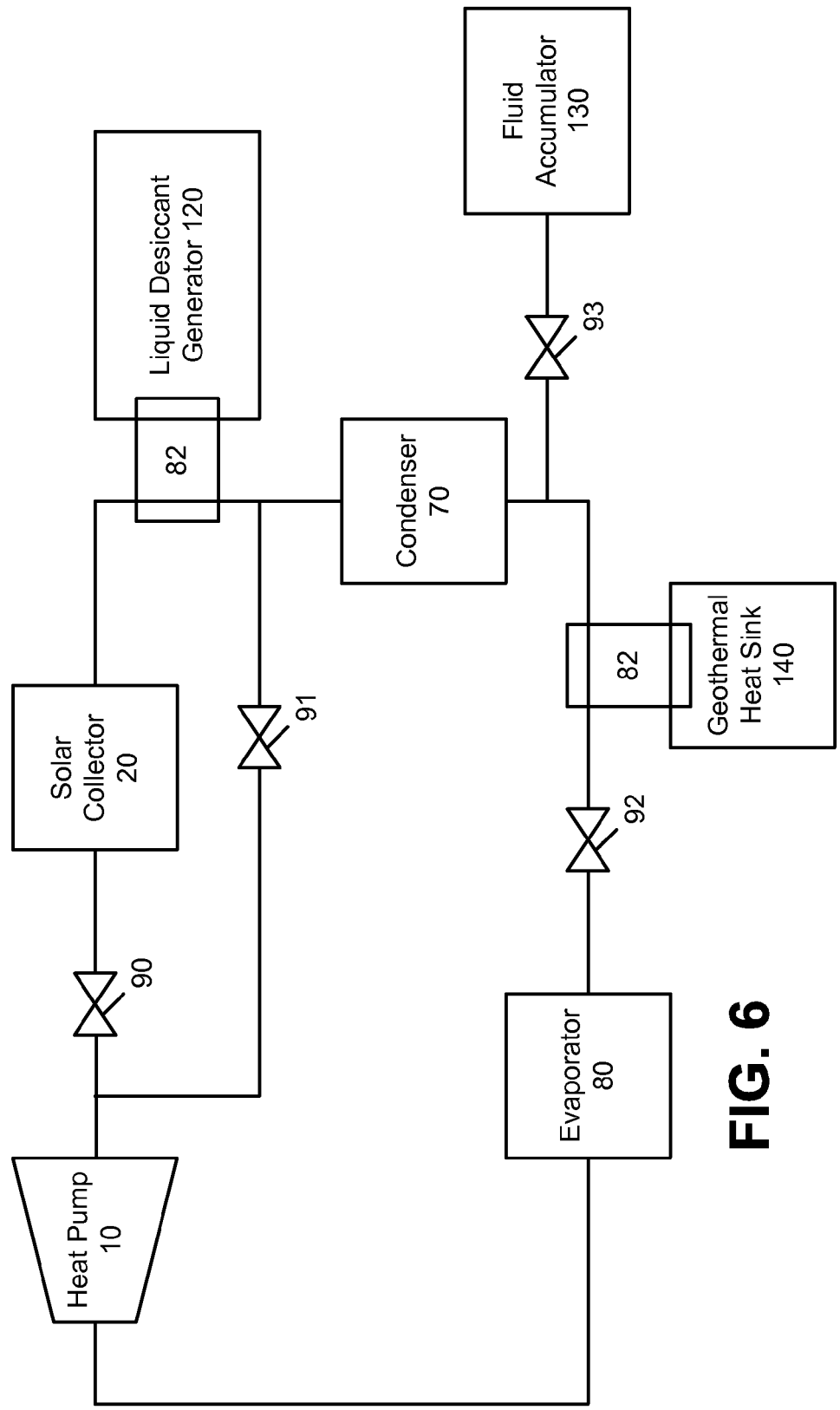
FIG. 6 is an illustration of one embodiment of an integrated solar collector and heat pump with an integrated desiccant dehumidifier in accordance with the present invention.

Turning to FIG. 6, FIG. 6 is a sequential flow diagram of one embodiment of a heat pump with integral solar collector in accordance with the present invention. In the embodiment of FIG. 6, heat pump 10 and solar collector 20 are depicted as further comprising a liquid desiccant generator 120 and a geothermal 140 as a thermal sink. It is understood that the heat pump with integral solar collector can operate with either the liquid desiccant generator 120 or geothermal 140 heat sink, as well as the shown combination. Heat pump 10 increases the operating pressure of the working fluid in part by utilizing a controllable valve 90 to provide back pressure upstream of solar collector 20 while also serving as a mass flow control (i.e., working fluid pump). Solar collector 20 increases the working fluid temperature of the portion of the working fluid being transported through the collector as determined by the control system and regulated with valve 90. The operation in FIG. 6 depicts heat pump 10 operating as an air conditioning or refrigeration device to provide the sensible cooling while liquid desiccant generator 120 provides latent cooling. The goal is thus to provide cooling therefore a significant portion of the working fluid is desired to bypass, by regulating control valve 91, solar collector 20 while the solar collector boosts the working fluid temperature through heat exchanger 82 as required to regenerate the liquid desiccant solution. The working fluid having been transported through the parallel circuit is combined upstream of condenser 70 where the working fluid temperature approaches the ambient temperature. It is understood that condenser 70 can be selected from the range of known condensers including wet, air, evaporative, etc. FIG. 6 also depicts a working fluid mass management control system though represented for brevity by a control valve 93 to enable working fluid to enter or leave fluid accumulator 130 as noted in earlier embodiments. The working fluid can then be optionally sub-cooled through a heat exchanger 82 in thermal communication with a shallow depth (i.e., surface as known in the geothermal heat pump application, as compared to deep well geothermal for power generation) geothermal 140 that serves as a thermal sink upstream of expansion valve 92. Expansion valve 92 decreases the pressure achieving rapid cooling of the working fluid that subsequently absorbs heat through evaporator 80.

Figure 7:
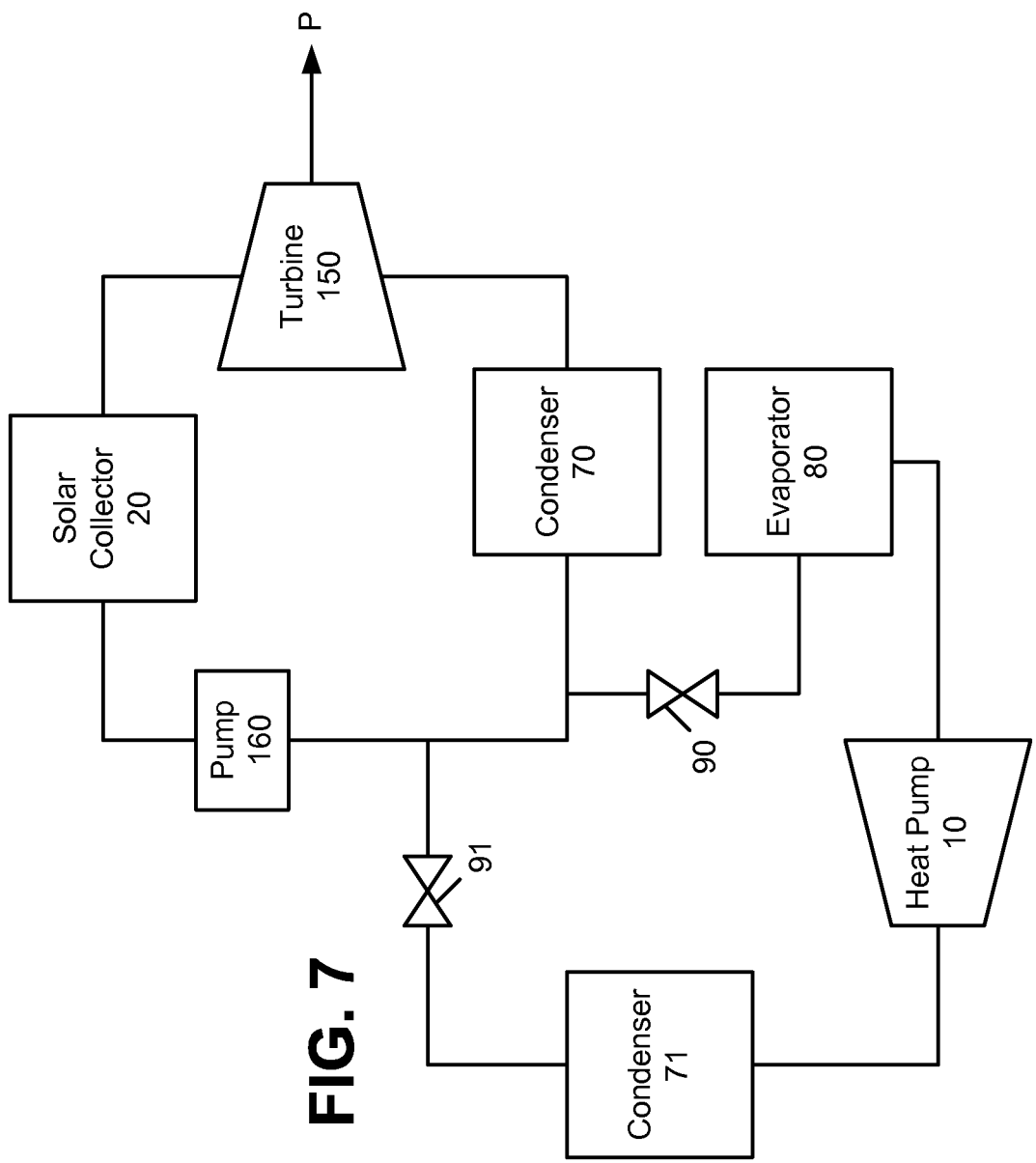
FIG. 7 is an illustration of one embodiment of an integrated solar collector and heat pump with an integrated power generating expander in accordance with the present invention.

Turning to FIG. 7, FIG. 7 is a sequential flow diagram of one embodiment of a heat pump with integral solar collector in accordance with the present invention. In the embodiment of FIG. 7 heat pump solar collector depicts an integral power generating cycle with an air conditioning/refrigeration thermodynamic cycle where both systems operate on the same working fluid. Beginning the cycle downstream of heat pump 10, heat pump 10 increases the working fluid pressure to the same low side pressure of the power generating cycle (which is downstream of valve 91 and condenser 70). The working fluid downstream of heat pump 10 then passes through condenser 71 to condense the working fluid prior to reaching pump 160 as a method of limiting cavitation. Pump 160 subsequently raises the working fluid, which is now at a significantly higher density, to the power generating high side pressure. The high pressure working fluid, which has increased the working fluid temperature by the heat of compression, now passes through solar collector 20 to vaporize and optionally to superheat the fluid as a means of increasing the enthalpy and thermodynamic efficiency of the power generating cycle. The now superheated working fluid enters turbine 150 inlet in order to produce shaft work (i.e., mechanical energy) that can further be transformed into electricity or hydraulic energy. As known in the art, the working fluid enters condenser 70 in order to reduce the pumping energy requirements to return the relatively cool working fluid to the high side pressure. It is understood that the turbine can be any expander device, as the pump can also include a turbo-pump or positive displacement devices. The control system regulates in real time the mass flow of the working fluid that will further be expanded in order to match the air conditioning/refrigeration demands with thermal energy being transferred through evaporator 80. It is further understood that pump 160, heat pump 10, and turbine 150 can operate at partial loads through means as known in the art.

Turning to FIG. 8, FIG. 8 is a sequential flow diagram of one embodiment of a heat pump with integral solar collector in accordance with the present invention. In the embodiment of FIG. 8 heat pump solar collector depicts a hybrid solar thermal and photovoltaic configuration. The precise objective of the integrated heat pump and photovoltaic cell system is to operate with the control system pressure and temperature control such that the working fluid transforms from a liquid/supercritical to a vapor/superheated fluid within the backside of photovoltaic cell 200. The operating pressure is dynamically modulated such that the temperature at state point #2 is less than lesser of the maximum junction temperature of PV cell 200 or desired operating temperature. The working fluid subsequently passes through solar collector 220 to ensure that the working fluid doesn't create cavitation in heat pump 10. The now high pressure working fluid also at the elevated temperature due to heat of compression is at sufficiently high temperatures to drive a range of thermal sinks. These thermal sinks include single, double or triple effect absorption chillers 230. Subsequently the working fluid passes through thermal sinks requiring sequentially lower operating temperatures such as process heat 240 and then domestic hot water 250. The control system will enable the working fluid to pass through condenser 70 in the event the working fluid temperature remains higher than the ambient or wet bulb temperature, which would be obtained by activating the condenser fans/motors. The working fluid now transfers thermal energy by absorbing energy through evaporator 80 and now returning to the backside of the PV cell 200 where thermal energy is transferred into the working fluid through the embedded microchannel heat exchanger 210.

Turning to FIG. 9, FIG. 9 is a sequential flow diagram of one embodiment of a heat pump with integral solar collector in accordance with the present invention. In the embodiment of FIG. 9 heat pump solar collector depicts a domestic hot water heat pump utilizing the same working fluid within the entire system. This embodiment anticipates the utilization of traditional working fluids where a maximum temperature limit must be maintained to ensure no thermal disassociation or break down occurs. The method of control includes a dynamic control system that ensures the operating temperature of the working fluid downstream of solar collector 220, which is, in one embodiment, a microchannel heat exchanger, is less than the maximum working fluid temperature and also to ensure that the working fluid is a vapor prior to entering heat pump 10. The control system ideally has the means to control the discharge pressure, the mass flow rate, and bypass valves including a variable diverter valve 260 having variable positions to modulate the transferring of heat from the working fluid into the domestic hot water system 250. The working fluid subsequently enters the condenser 70 where the condenser motors and fans are controlled in order to maximize energy transfer from the solar collector to the domestic hot water as a function of the solar flux, ambient temperature, domestic hot water consumption, and/or domestic hot water storage tank temperature.

It is understood in this invention that a combination of scenarios can be assembled through the use of fluid valves and/or switches such that any of the alternate configurations can be in parallel enabling the solar collector to support a wide range of thermal sinks.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A heat pump system comprising:
at least one working fluid;
at least one heat pump having an inlet and an outlet designed to receive and utilize the at least one working fluid;
at least one solar collector having an inlet and an outlet designed to receive and utilize the at least one working fluid, wherein the inlet of the at least one solar collector is in fluid communication via the at least one working fluid with the outlet of the at least one heat pump;
at least one working fluid inventory storage system in fluid communication with both the at least one heat pump and the at least one solar collector, wherein the at least one working fluid inventory storage system is designed to work in a bi-directional manner, and wherein the at least one working fluid inventory storage system comprises:
  at least one bi-directional expansion valve in fluid communication with both the outlet of the at least one heat pump and the inlet of the at least one solar collector via the at least one working fluid;
  at least one bi-directional condenser in fluid communication with the at least one bi-directional expansion valve via the at least one working fluid; and
  at least one bi-directional fluid accumulator in fluid communication with the at least one bi-directional condenser via the at least one working fluid;
a first temperature sensor in fluid communication with the at least one working fluid, the first temperature sensor disposed downstream from the at least one heat pump and upstream of the at least one solar collector;
a second temperature sensor in fluid communication with the at least one working fluid, the second temperature sensor located downstream of the at least one solar collector;
a third temperature sensor in fluid communication with the at least one working fluid, the third temperature sensor disposed between the at least one bi-directional expansion valve and the at least one bi-directional fluid accumulator; and
a first pressure sensor in fluid communication with the at least one working fluid, the first pressure sensor disposed between the at least one bi-directional expansion valve and the at least one bi-directional fluid condenser.

2. A heat pump system comprising:
at least one working fluid;
at least one heat pump designed to receive and utilize the at least one working fluid;
at least one thermal sink designed to receive and utilize the at least one working fluid, wherein the at least one thermal sink is in fluid communication via the at least one working fluid with the at least one heat pump via a first two-way valve, and wherein the first two-way valve is disposed downstream from the at least one heat pump;
at least one solar collector designed to receive and utilize the at least one working fluid, wherein the at least one solar collector is in fluid communication via the at least one working fluid with the at least one thermal sink, and wherein the at least one solar collection is in fluid communication via the at least one working fluid with the at least one heat pump via the first two-way valve; and at least one evaporator designed to receive and utilize the at least one working fluid, wherein the at least one evaporator is in fluid communication via the at least one working fluid with both the at least one thermal sink and the at least one solar collector via a second two-way valve and at least one valve, wherein:
- the second two-way valve and the at least one valve are disposed between the at least one evaporator and the at least one thermal sink,
- the second two-way valve and the at least one valve are further disposed between the at least one evaporator and the at least one solar collector, and
- the at least one evaporator is in fluid communication via the at least one working fluid with the at least one heat pump.

3. A heat pump system comprising:
at least one working fluid;
at least one heat pump designed to receive and utilize the at least one working fluid;
at least one solar collector designed to receive and utilize the at least one working fluid, wherein the at least one solar collector is in fluid communication via the at least one working fluid with the at least one heat pump;
a first valve disposed downstream from the at least one heat pump and upstream of the at least one solar collector;
at least one liquid desiccant generator/heat exchanger combination designed to receive and utilize the at least one working fluid, wherein the at least one liquid desiccant generator/heat exchanger combination is in thermal communication, or fluid communication, via the working fluid with the at least one solar collector;
at least one condenser designed to receive and utilize the at least one working fluid, wherein the at least one condenser is in fluid communication via the at least one working fluid with the at least one heat pump, and wherein the at least one condenser is in thermal communication, or fluid communication, via the working fluid with the at least one liquid desiccant generator/heat exchanger combination;
a second valve disposed between the at least one condenser and the at least one heat pump;
at least one fluid accumulator designed to receive and utilize the at least one working fluid, wherein the at least one fluid accumulator is in fluid communication via the at least one working fluid with the at least one condenser;
a third valve disposed between the at least one fluid accumulator and the at least one condenser;
at least one geothermal heat sink/heat exchanger combination designed to receive and utilize the at least one working fluid, wherein the at least one geothermal heat sink/heat exchanger combination is in thermal communication, or fluid communication, via the at least one working fluid with the at least one condenser, and wherein the at least one geothermal heat sink/heat exchanger combination is in thermal communication, or fluid communication, with the at least one fluid accumulator via the at least one working fluid, and wherein the third valve is disposed between the at least one fluid accumulator and the at least one geothermal heat sink/heat exchanger; and at least one evaporator designed to receive and utilize the at least one working fluid, wherein the at least one evaporator is in thermal communication, or fluid communication, via the at least one working fluid with the at least one geothermal heat sink/heat exchanger combination via a fourth valve, and wherein the at least one evaporator is in fluid communication via the at least one working fluid with the at least one heat pump.

4. A heat pump system comprising:
at least one working fluid;
an upper loop comprising:
- at least one pump;
- at least one solar collector;
- at least one turbine; and
- at least one condenser,
- wherein the at least one pump, the at least one solar collector, the at least one turbine and the at least one condenser are all designed to receive and utilize the at least one working fluid and are all in fluid communication via the at least one working fluid and together form the upper loop; and a lower loop comprising:
- at least one heat pump;
- at least one condenser;
- at least one evaporator,
- wherein the at least one heat pump, the at least one condenser and the at least one evaporator are all designed to receive and utilize the at least one working fluid and are all in fluid communication via the at least one working fluid and together form the lower loop, and
- wherein the bottom loop is in fluid communication with the top loop via at least two valves.

5. A heat pump system comprising:
at least one working fluid;
an evaporator configured to receive the at least one working fluid;
at least one photovoltaic cell disposed downstream from the evaporator and in thermal communication with the evaporator via a heat exchanger;
at least one heat pump disposed downstream from the at least one photovoltaic cell;
at least one hot water device disposed downstream from the at least one heat pump;
at least one condenser disposed downstream from the at least one hot water device;
a first valve disposed downstream from the at least one condenser and upstream of the evaporator; and
a by-pass circuit designed to permit the at least one working fluid to by-pass of the at least one hot water device.

6. The heat pump system of claim 5, wherein the at least one photovoltaic cells comprises at least two photovoltaic cells.

* * * * *